(12) United States Patent
Toi et al.

(10) Patent No.: US 12,481,488 B2
(45) Date of Patent: Nov. 25, 2025

(54) PROCESSOR AND COMPILER

(71) Applicant: RENESAS ELECTRONICS CORPORATION, Tokyo (JP)

(72) Inventors: Takao Toi, Tokyo (JP); Kengo Nishino, Tokyo (JP); Daigo Hayashi, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 220 days.

(21) Appl. No.: 18/333,025

(22) Filed: Jun. 12, 2023

(65) Prior Publication Data

US 2024/0053970 A1 Feb. 15, 2024

(30) Foreign Application Priority Data

Aug. 9, 2022 (JP) .................................. 2022-127072

(51) Int. Cl.
*G06F 8/41* (2018.01)
(52) U.S. Cl.
CPC .................................... *G06F 8/452* (2013.01)
(58) Field of Classification Search
CPC ...................................................... G06F 8/452
See application file for complete search history.

(56) References Cited

U.S. PATENT DOCUMENTS

| 7,120,903 | B2 | 10/2006 | Toi et al. | |
|---|---|---|---|---|
| 8,117,603 | B2 | 2/2012 | Nakamura | |
| 9,201,996 | B2 | 12/2015 | Toi et al. | |
| 9,372,675 | B1* | 6/2016 | Pescosolido | ............ G06F 3/048 |
| 2011/0185347 | A1* | 7/2011 | Rose | ..................... G06F 8/4441 |
| | | | | 717/160 |
| 2015/0106798 | A1* | 4/2015 | Steiner | ................ G06F 11/1451 |
| | | | | 717/160 |
| 2019/0102338 | A1* | 4/2019 | Tang | ..................... G06F 9/3802 |

FOREIGN PATENT DOCUMENTS

| JP | 2003-099409 A | 4/2003 | |
|---|---|---|---|
| JP | 2008-071089 A | 3/2008 | |
| JP | 2014-006650 A | 1/2014 | |
| WO | WO-2005078579 A1 * | 8/2005 | ............. G06F 8/443 |

* cited by examiner

*Primary Examiner* — Phillip H Nguyen
(74) *Attorney, Agent, or Firm* — Rimon P.C.

(57) ABSTRACT

When a counter circuit that repeatedly counts a loop variable, an accumulator variable, or the like is configured by a programmable device, a processing delay occurs. The processor comprises an array of programmable logic and at least one dedicated counter circuit for counting variables that are repeatedly modified.

11 Claims, 30 Drawing Sheets

FIG. 3

```
/* Outer loop */
for (y=0; y<100-2; y++) {
  /* Inner loop */
  for (x=0; x<200-2; x++) {
    /*    3x3 convolution process    */
    sum = 0;
    for (j=0; j<3; j++) {
      for (i=0; i<3; i++) {
          sum += kernel[j][i] * image[y+j][x+i];
      }
    }
    sum /= 9;
  }
}
```

FIG. 6

```
for (x=0; x<max; x++) {
}
```

FIG. 11

```
x=0;
do{
   x++;
}while(x<max);
```

FIG. 21

```
for (y=0; y<ymax; y++) {
...
    for (x=0; x<xmax; x++) {
        ...
        array[x]=z;
    }
    array2[y]=w;
}
```

FIG. 24

```
acum = 0;
for (x=0; x<max; x++) {
...
    acum += y;
}
```

PROCESSOR AND COMPILER

CROSS-REFERENCE TO RELATED APPLICATIONS

The disclosure of Japanese Patent Application No. 2022-127072 filed on Aug. 9, 2022, including the specification, drawings and abstract is incorporated herein by reference in its entirety.

BACKGROUND

The present disclosure relates to a processor and a compiler.

Japanese Unexamined Patent Application Publication No. 2003-99409 (hereafter, Patent Document 1) discloses that in a system that combines Dynamically reconfigurable processor and operation synthesizer, multistate circuit is folded into time series to reuse calculator and routing resources. For this reason, in such a system, it is possible to execute a program by increasing the area-efficiency of a reconfigurable device having a fine granularity, such as a FPGA (Field Programmable Gate Array) that continues to use a circuit that has been written once.

Japanese Unexamined Patent Application Publication No. 2008-71089 (hereafter, Patent Document 2) discloses that combines a program written in a motion description language such as C language into circuitry for rewritable programmable devices such as Dynamically reconfigurable processor. In this motion synthesis, a state transition machine (FSM) and a data path are generated, and circuitry for switching the data paths in time series according to the respective states is generated. As one of parallelization techniques in this motion synthesis, a method of synthesizing a loop description as a pipeline circuit is known.

Japanese Unexamined Patent Application Publication No. 2014-6650 (hereafter, Patent Document 3) discloses that in motion synthesis, which synthesizes pipeline circuitry, methods to control execution for each stage of the pipeline.

SUMMARY

When a counter circuit that repeatedly counts loop variables, accumulator variables, and the like is configured by programmable logic, there is a problem that a delay in processing occurs.

Other objects and novel features will become apparent from the description of this specification and the accompanying drawings.

The processor of one embodiment comprises an array of multiple programmable logic and at least one dedicated counter circuit for counting variables that are repeatedly modified.

According to the processor of the embodiment, since the counter circuit is formed as a dedicated circuit, it is possible to avoid a delay in processing.

BRIEF DESCRIPTION OF THE DRAWINGS

FIG. 3 is a diagram illustrating a filtering process description by C language.

FIG. 6 is a diagram illustrating an example of a loop description of a second embodiment.

FIG. 11 is a diagram illustrating an exemplary loop-description of modified example according to the second embodiment.

FIG. 21 is a diagram illustrating a configuration of a modified example counter circuit 2X according to the sixth embodiment.

FIG. 24 is a diagram illustrating an example of a program using an accumulator.

DETAILED DESCRIPTION

Hereinafter, embodiments will be described with reference to the drawings.

First Embodiment

Figure 1:
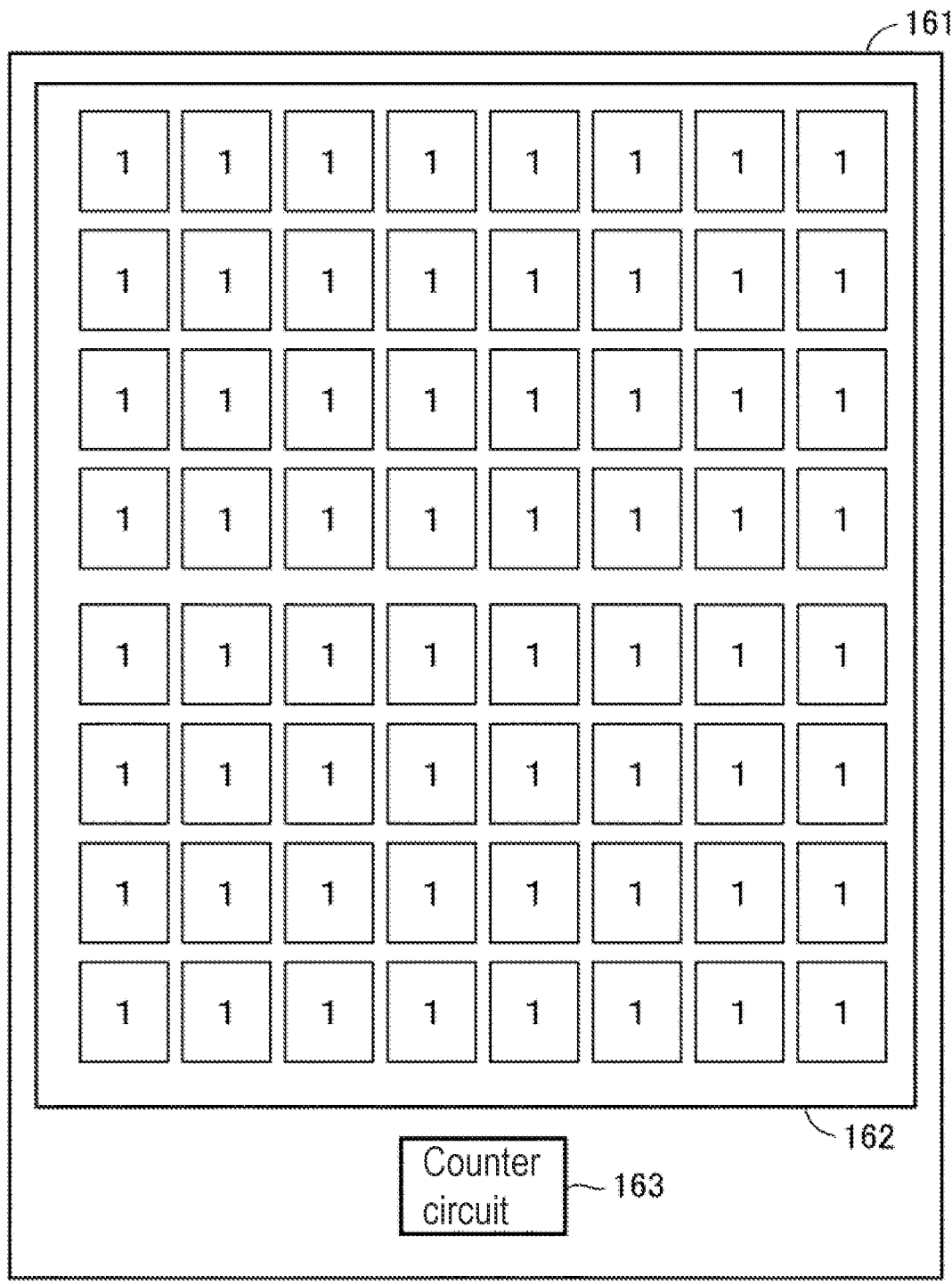
FIG. 1 is a diagram illustrating a configuration of a processor 161 according to a first embodiment.

FIG. 1 is a diagram illustrating a configuration of a processor according to a first embodiment.

The processor 161 comprises an array 162 and at least one counter circuit 163.

The array 162 includes a plurality of programmable logics 1.

The programmable logics 1 provides computing resources such as adder, selector, and LUT.

The counter circuit 163 is a dedicated circuit for counting variables that are repeatedly changed. The variables that are repeatedly modified are, for example, a loop variable in a loop description or an accumulator variable in which an increment value is repeatedly added in the loop.

In this embodiment, since the counter circuit is formed as a dedicated circuit, it is possible to solve the problem that the process is delayed.

Second Embodiment

Figure 2:
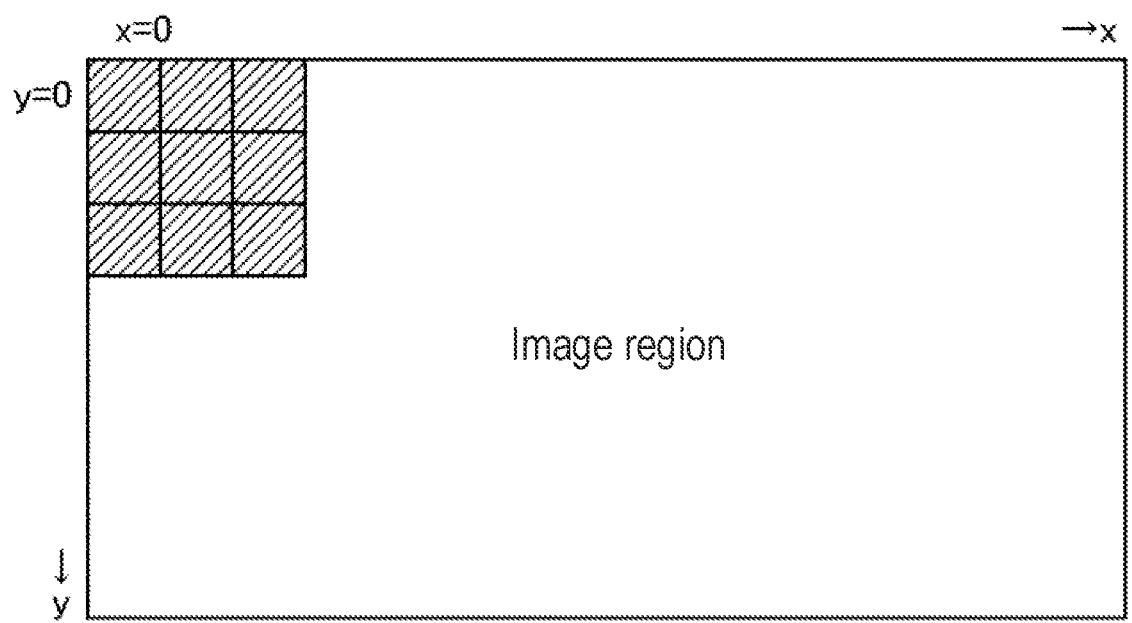
FIG. 2 is a diagram for explaining an image filtering.

FIG. 2 is a diagram for explaining an image filtering. The image data is convoluted by a FIR (Finite Impulse Response) filtering or the like. FIG. 2 shows an exemplary adaptation of a 3×3-pixel kernel filtering to the image.

FIG. 3 is a diagram illustrating a filtering process description by C language. The horizontal size (x direction) of the image is described as 200 pixels, the vertical size (y direction) is described as 100 pixels, and the kernel is described as 3×3 pixels. Since an invalid region of a total of two pixels can be formed for each pixel in the left and right directions, the maximum value in the x direction is set to (200-2) pixels, and the maximum value is set to (100-2) pixels by subtracting the invalid region of two pixels in the up and down direction in the same manner as in the X direction.

Processors such as CPU (Central Processing Unit) process sequentially, essentially as described. On the other hand, a processor such as a FPGA or a Dynamically reconfigurable processor or dedicated hardware can increase the process speed by executing a plurality of operations simultaneously.

Figure 4:
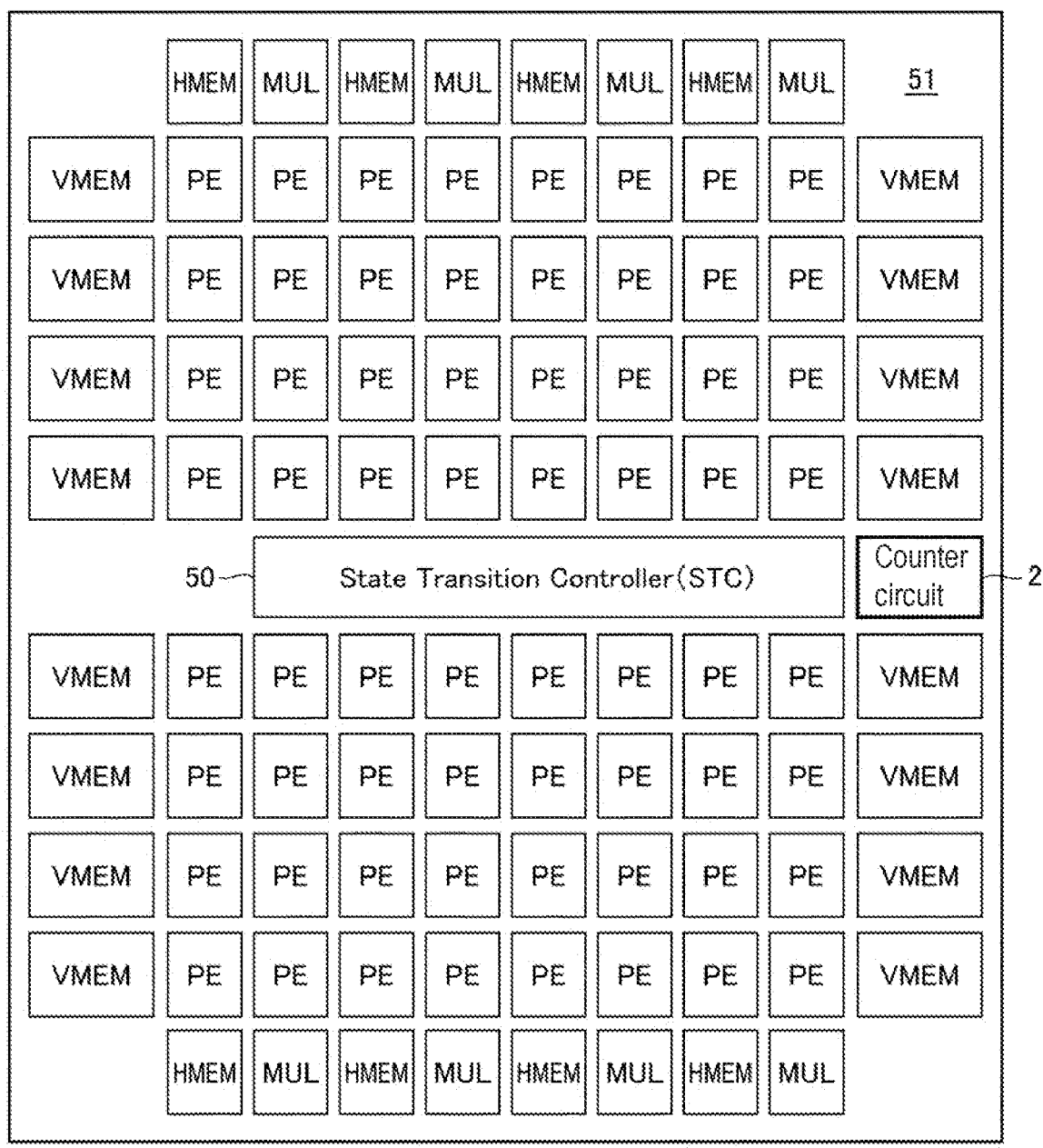
FIG. 4 is a diagram illustrating a configuration of a Dynamically reconfigurable processor according to the second embodiment.

FIG. 4 is a diagram illustrating a configuration of a Dynamically reconfigurable processor according to the second embodiment. Dynamically reconfigurable processor comprises an array 51 including a plurality of processing element PE capable of basic operations such as addition and subtraction, which are arithmetic elements, a larger arithmetic element such as a multiplier MUL, a memory HMEM, VMEM, and wires for connecting between them, and switches. Dynamically reconfigurable processor comprises a state transition controller 50. The State transition controller 50 controls the state transition of Dynamically reconfigurable processor by switching commands to the switches and processing elements PEs.

Figure 5:
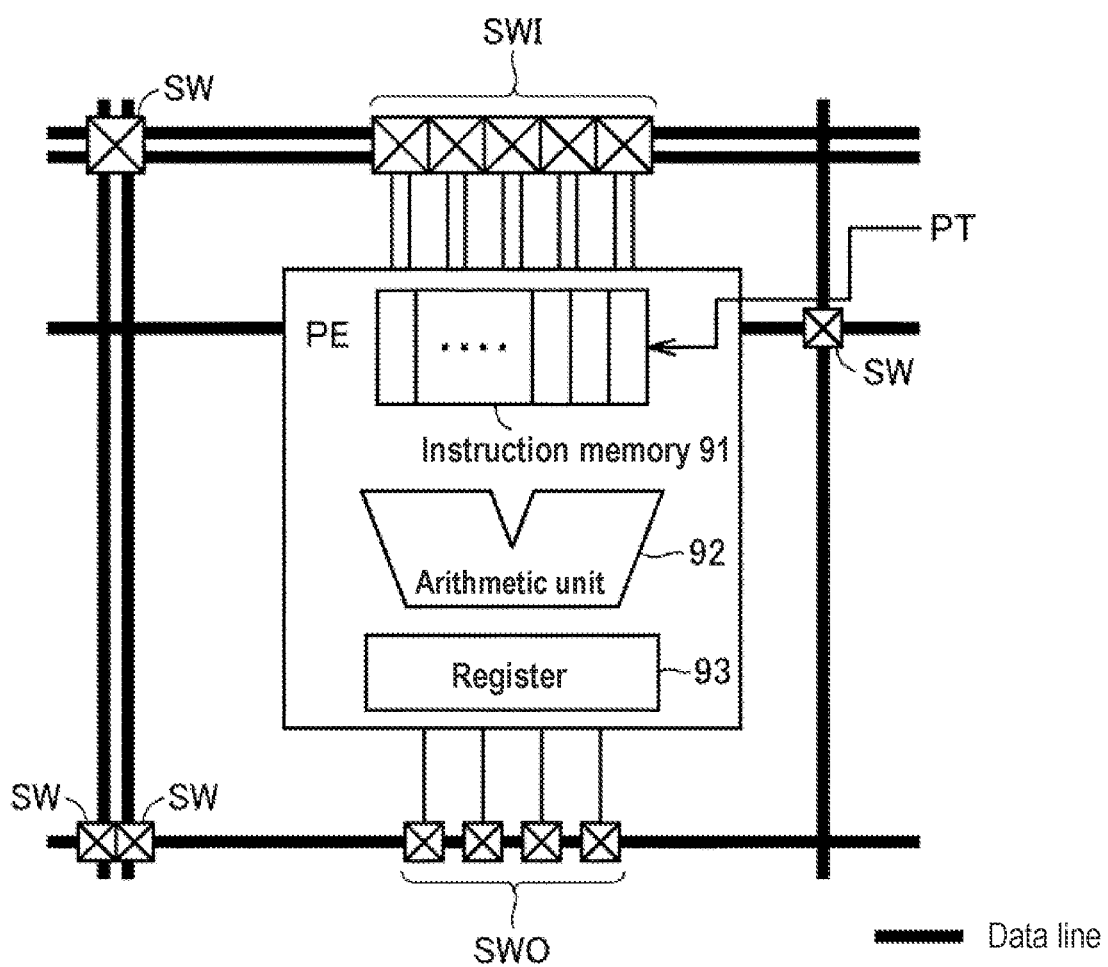
FIG. 5 is a diagram illustrating a configuration of the processing element PE.

FIG. 5 is a diagram illustrating a configuration of the processing element PE. The processing element PE includes an instruction memory 91, an arithmetic unit 92, and a register 93.

The instruction pointer PT from the State transition controller 50 designates an executable instruction in the instruction memory 91. The arithmetic unit 92 executes the instruction. The register 93 stores data. SWI switches whether data on the data line is to be inputted. SWO switches whether the data in the register 93 is outputted to the data line. SWs switch the transmission route.

The above-described image filtering can be realized by switching the instruction pointers and the switching SWs, SWI, SWO from the State transition controller 50. Filtering process part of the (3×3) kernel in the inner loop can then be pipelined. However, for the portion controlling the loop, since there is the same loop variable on both the left side and the right side as x=x+1 and self-referencing, the counter circuit for counting the loop variable, it is not possible to increase the operating frequency by pipelining.

The dynamically reconfigurable processor of this embodiment comprises a counter circuit 2 dedicated to counting loop-variables. The state transition controller 50 controls the state of dynamically reconfigurable processor by controlling the counter circuit 2.

Looping control can be described in either for or do-while statements. In for statement, the loop variable is added after comparing the loop variable with the maximum value. In do-while statement, the loop variable and the maximum value are compared after the addition of the loop variable. This embodiment shows the counter circuit for counting loop-variables in for statements.

Figure 6:
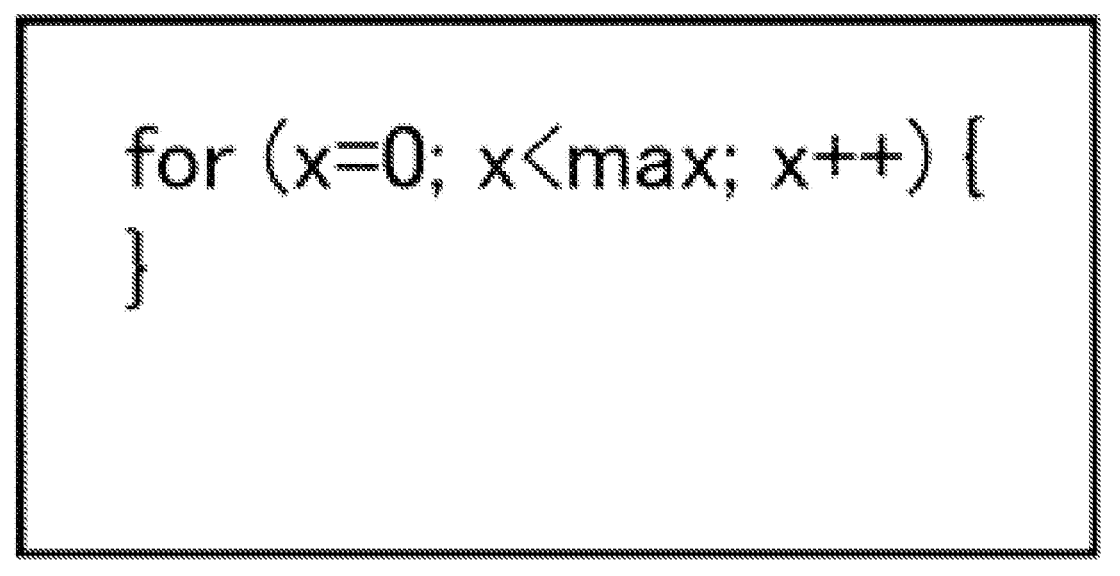
Figure 7:
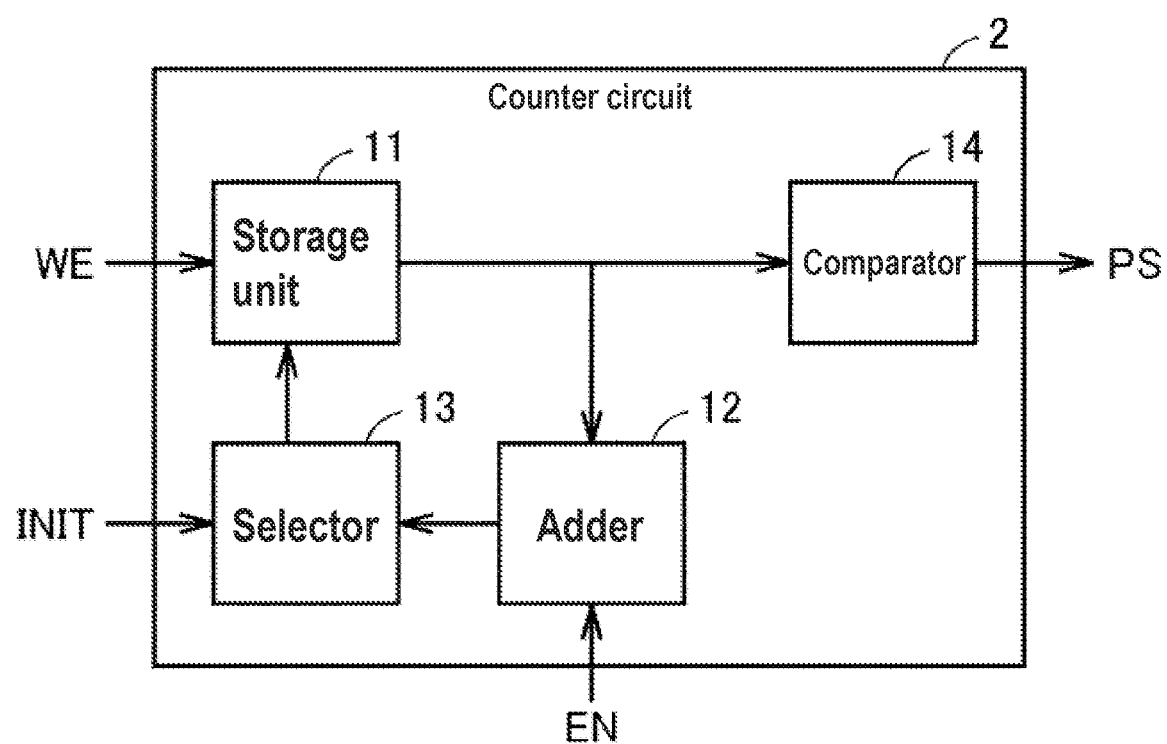
FIG. 7 is a block diagram representing components of a dedicated counter circuit 2 for counting loop variables of the loop of FIG. 6.

FIG. 6 is a diagram illustrating an example of a loop description of the second embodiment. FIG. 7 is a block diagram representing the components of a dedicated counter circuit 2 for counting the loop variable x of the loop of FIG. 6. The counter circuit 2 includes a storage unit 11, a selector 13, an adder 12, and a comparator 14.

The storage unit 11 stores the output of the selector 13 as a counter value (sCnt). When a write signal WE is asserted, the storage unit 11 updates the counter value (sCnt) according to the signal outputted from the selector 13.

The selector 13 stores an initial value (sInit). The selector 13 outputs the initial value (sInit) to the storage unit 11 when the initial value signal (INIT) is asserted. When the initial value signal (INIT) is not asserted, the selector 13 outputs the output signal of the adder 12 to the storage unit 11. The initial value (sInit) is, for example, "0".

The adder 12 stores an increment (sInc). When the addition instruction signal (EN) is asserted, the adder 12 adds output (sCnt) and increment (sInc) of the storage 11. The increment (sInc) is, for example, "1".

The comparator 14 stores a maximum value (sMax). The comparator 14 compares the counter value (sCnt) with the maximum value (sMax), and outputs a signal representing the comparison result. When the counter value (sCnt) reaches the maximum value (sMax), the comparator 14 asserts a loop-out condition-fulfillment-signal (PS).

Figure 8:
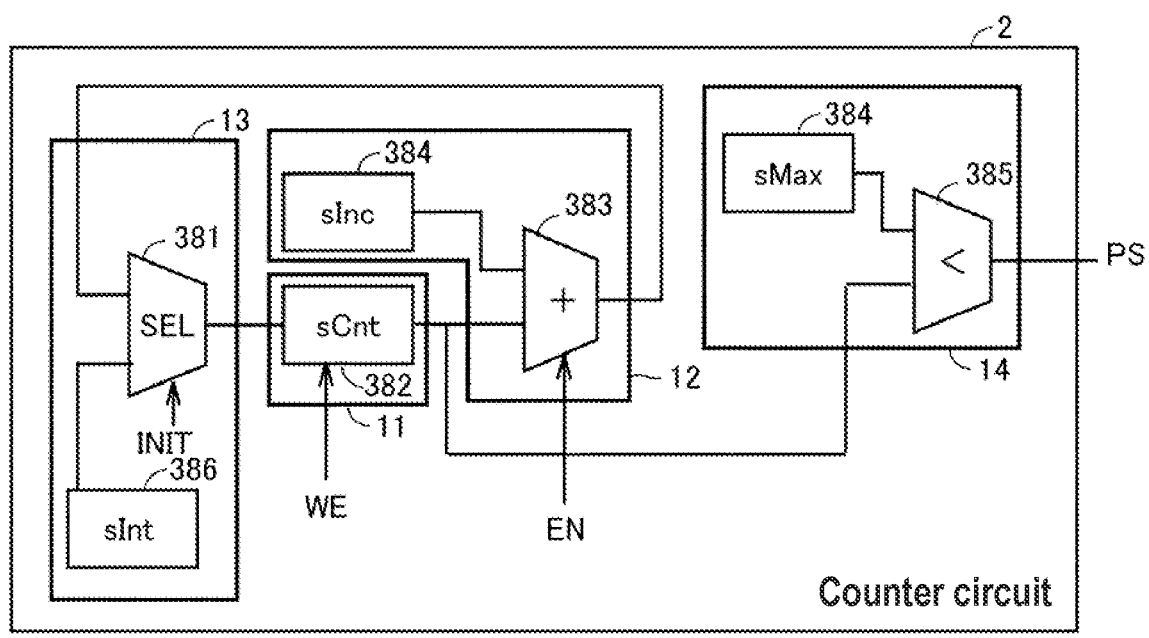
FIG. 8 is a diagram illustrating a detailed configuration of the counter circuit according to the second embodiment.

FIG. 8 is a diagram illustrating a detailed configuration of the counter circuit according to the second embodiment.

The selector 13 includes a selector 381 and a register 386. The selector 381 receives the initial value signal (INIT). The register 386 stores the initial value (sInit). The initial value (sInit) is, for example, "0".

The storage unit 11 includes a register 382. The register 382 stores a counter value (sCnt).

The adder 12 includes an adder 383 and a register 384. The adder 383 receives an addition instruction signal (EN). The register 384 stores an increment (sInc). The increment (sInc) is, for example, "1".

In this embodiment, by making the counter circuit a dedicated circuit, it is possible to shorten the delay and improve the operation rate.

Reference Example

Figure 9:
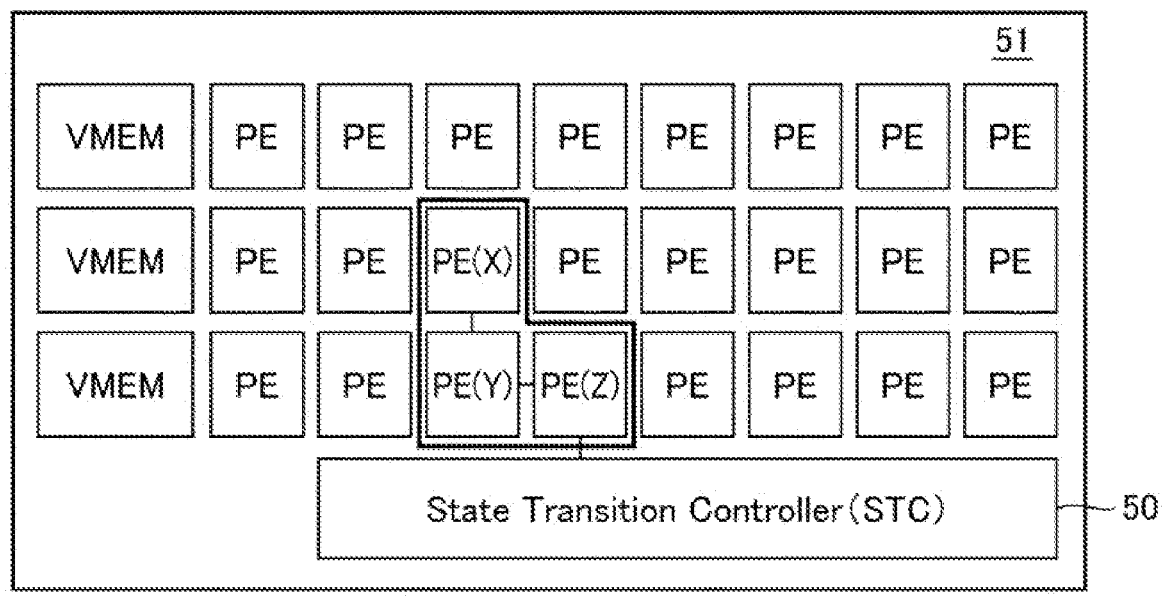
FIG. 9 is a diagram illustrating an example of a method of implementing a counter according to a reference example.

FIG. 9 is a diagram illustrating an example of a method of implementing a counter according to a reference example.

Figure 10:
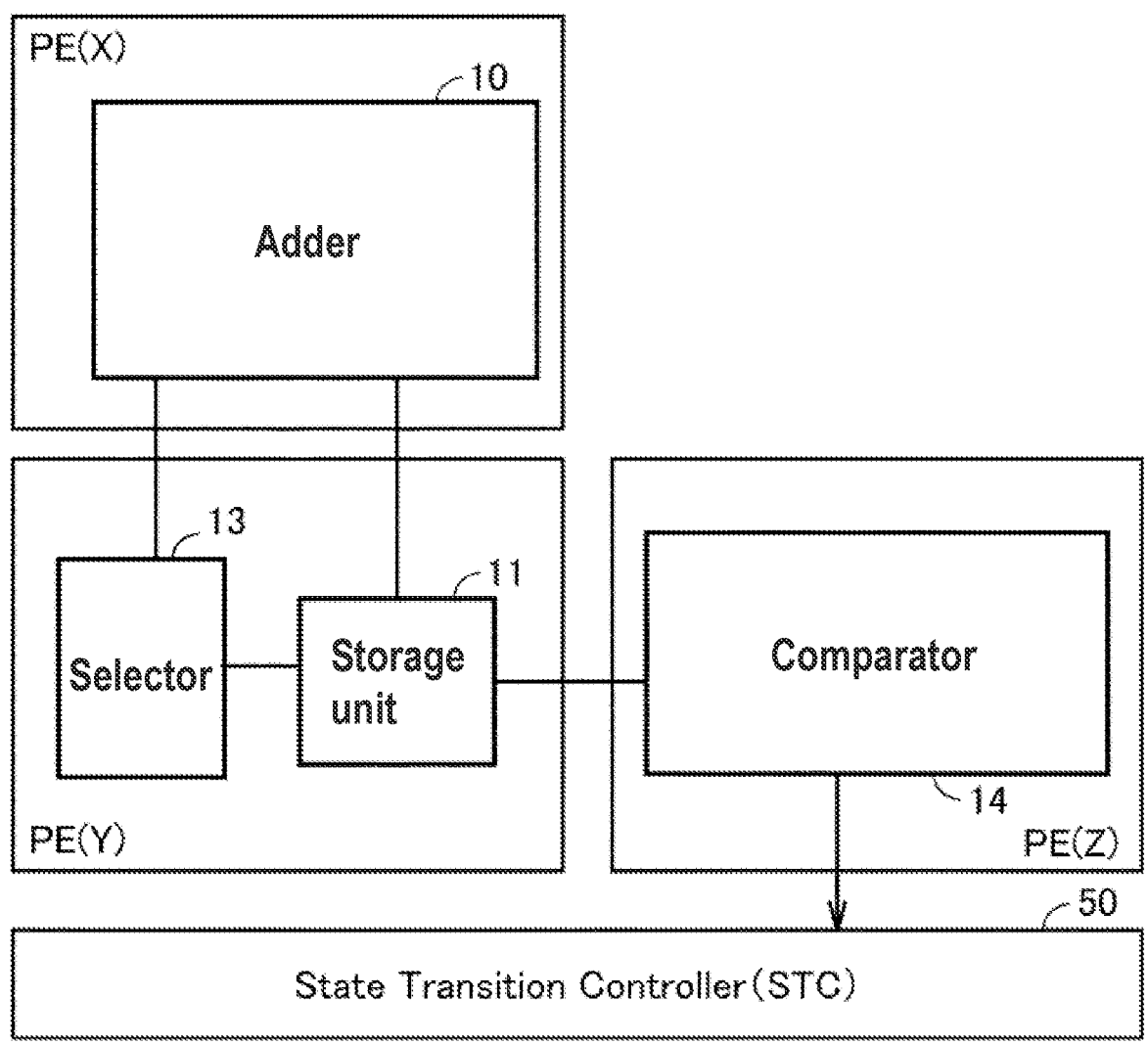
FIG. 10 is a diagram illustrating a configuration of the processing elements PE (X), PE (Y), and PE (Z).

FIG. 10 is a diagram illustrating a configuration of the processing elements PE (X), PE (Y), and PE (Z).

Three PE (X), PE (Y), and PE (Z) realize the counter circuit. As described above, although the PE in the programmable logic or the LUT of the FPGA has a high degree of freedom and can form a general-purpose circuit, the delay is larger than that of the dedicated hardware circuit.

Modified Example of Second Embodiment

Figure 11:
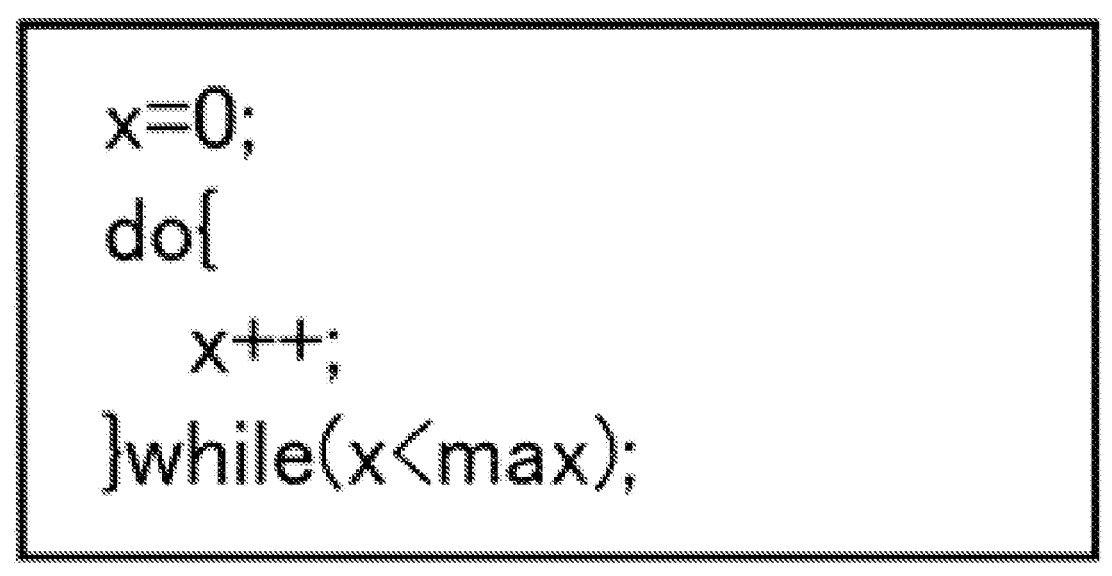
Figure 12:
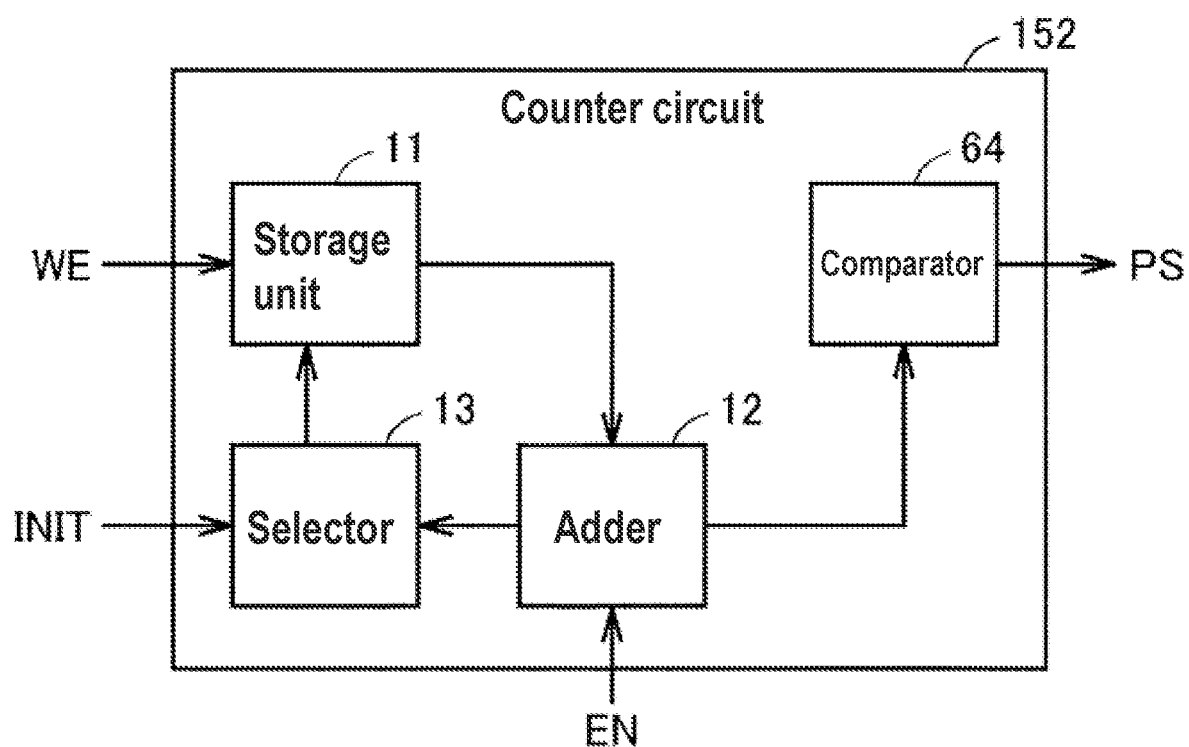
FIG. 12 is a block diagram representing components of a dedicated counter circuit 2A for counting loop variables of the loop of FIG. 11.

FIG. 11 is a diagram illustrating an exemplary loop-description of modified example according to the second embodiment. FIG. 11 illustrates the use of a do-while statement as an exemplary loop-description. FIG. 12 is a block diagram representing components of a dedicated counter circuit 152 for counting the loop variable x of the loop of FIG. 11. The counter circuit 152 includes a storage unit 11, a selector 13, an adder 12, and a comparator 64.

The configuration and operation of the storage unit 11, the selector 13, and the addition unit 12 of the counter circuit 152 are the same as the configuration and operation of the storage unit 11, the selector 13, and the addition unit 12 of the counter circuit 2, and thus the description thereof will not be repeated.

The comparator 64 stores a maximum value (sMax). The comparator 14A compares the output of the adder 12 with the maximum value (sMax). When the output of the adder 12 reaches the maximum value (sMax), the comparator 64 asserts the loop-out condition-satisfying signal (PS).

Third Embodiment

Figure 13:
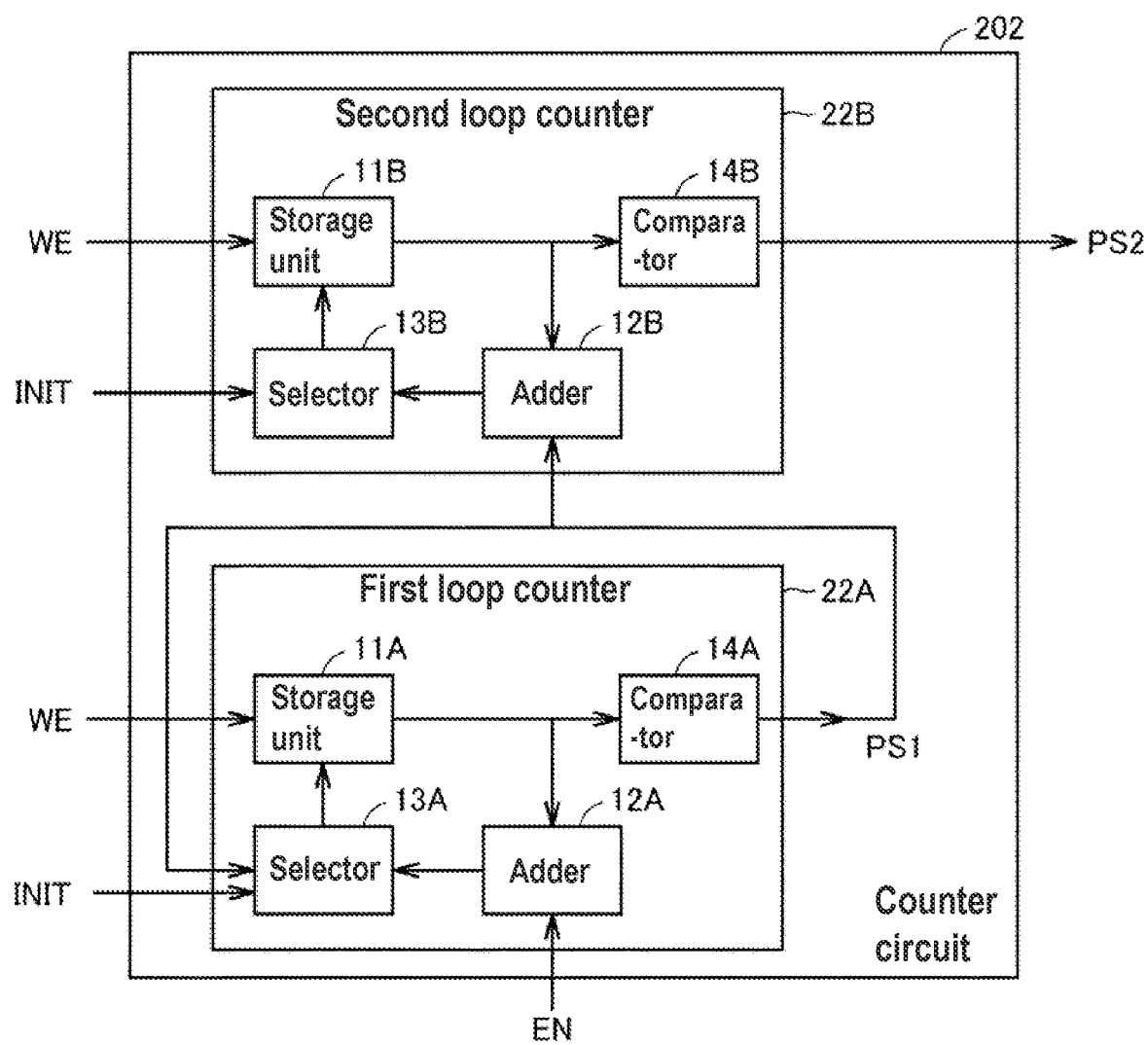
FIG. 13 is a block diagram illustrating components of the counter circuit 202 according to a third embodiment.

FIG. 13 is a block diagram illustrating components of the counter circuit 202 according to the third embodiment. The counter circuit 202 counts loop variables of loop A (e.g., x in FIG. 3) and loop variables of loop B outside one of loop A (e.g., y in FIG. 3). The counter circuit 202 includes a first loop counter 22A for counting the loop variable of the loop A and a second loop counter 22B for counting the loop variable of the loop B.

The first loop counter 22A outputs a loop termination condition establishment signal (PS1) (first signal) to the second loop counter 22B when the termination condition of the loop A is satisfied. When receiving the loop termination condition establishment signal (PS1) (first signal), the second loop counter 22B increments the loop variable of the loop B. The second loop counter 22B outputs the loop termination condition establishment signal (PS1) (second signal) to the state transition controller 50 when the termination condition of the loop B is satisfied.

The first-loop counter 22A includes a storage unit 11A, a selector 13A, an adder 12A, and a comparator 14A. The second-loop counter 22B includes a storage unit 11B, a selector 13B, an adder 12B, and a comparator 14B.

The storage unit 11A stores a counter value (sCnt1) of the loop variable of the loop A. When the write signal WE is asserted, the storage unit 11A updates the counter value (sCnt1) according to the output signal of the selector 13A.

The selector 13A stores an initial value (sInit1). The selector 13A outputs an initial value (sInit1) to the storage unit 11A when the initial value signal (INIT) is asserted or when the loop-out condition-fulfillment signal (PS1) is asserted. The selector 13A outputs the output signal of the adder 12A to the storage unit 11A when the initial value signal (INIT) is not asserted and the loop-out condition-satisfying signal (PS1) is not asserted. The initial value (sInit1) is, for example, "0".

The adder 12A stores an increment (sInc1). When the addition instruction signal (EN) is asserted, the addition unit 12A adds the output (sCnt1) of the storage unit 11A and the increment (sInc1). The increment (sInc1) is, for example, "1".

The comparator 14A stores a maximum value (sMax1). The comparator 14A compares the counter value (sCnt1) with the maximum value (sMax1). When the counter value (sCnt1) reaches the maximum value (sMax1), the comparator 14A asserts the loop-out condition-fulfilling signal (PS1). The loop termination condition-satisfying signal (PS1) is sent to the adder 12B of the selector 13A and the second loop counter 22B.

The storage unit 11B stores a counter value (sCnt2) of the loop variable of the loop B. When the write enable signal WE is asserted, the storage unit 11B updates the counter value (sCnt2) according to the output signal of the selector 13B.

The selector 13B stores an initial value (sInit2). The selector 13B outputs the initial value (sInit2) to the storage unit 11B when the initial value signal (INIT) is asserted. The selector 13B outputs the output signal of the adder 12B to the storage unit 11B when the initial value signal (INIT) is not asserted. The initial value (sInit2) is, for example, "0".

The adder 12B stores an increment (sInc2). When the loop termination condition establishment signal (PS1) is asserted, the addition unit 12B adds the output (sCnt2) of the storage unit 11B and the increment (sInc2). The increment (sInc2) is, for example, "1".

The comparator 14B stores a maximum value (sMax2). The comparator 14B compares the counter value (sCnt2) with the maximum value (sMax2). The loop termination condition establishment signal (PS2) is sent to the state transition controller 50.

In the counter circuit 202 of this embodiment, when the number of repetitions in the loop A reaches the specified number of times, the condition for comparative the first loop counter 22A is satisfied, and a signal for instructing the addition is sent to the second loop counter 22B, and the first loop counter 22A itself returns to the initial value state of the loop, so that the operation can proceed to the next-repetition operation. When the number of repetitions in the loop B reaches the specified number of times, the second loop counter 22B is compared, and the loop exits. Then, it is possible to proceed to the next operation.

Modified Example of Third Embodiment

Figure 14:
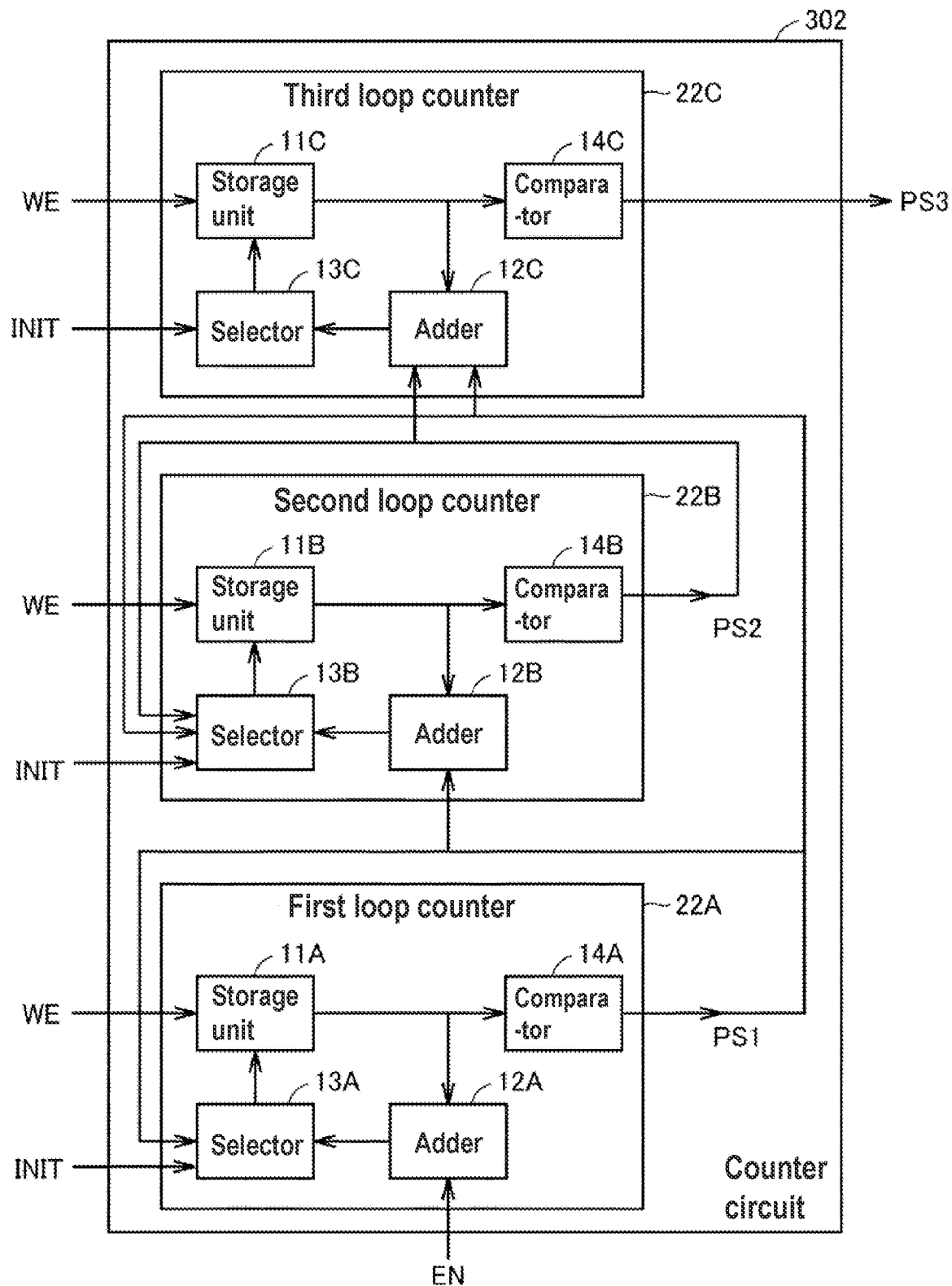
FIG. 14 is a block diagram illustrating components of modified example counter circuit 302 according to the third embodiment.

FIG. 14 is a diagram illustrating components of modified example counter circuit 302 according to the third embodiment. The counter circuit 302 counts loop variables of loop A, loop variables of loop B outside one of loop A, and loop variables of loop C outside one of loop B. The counter circuit 302 includes a first loop counter 22A for counting the loop variable of the loop A, a second loop counter 22B for counting the loop variable of the loop B, and a third loop counter 22C for counting the loop variable of the loop C.

Since the first-loop counter 22A is the same as that of the third embodiment, the explanation will not be repeated.

The second-loop counter 22B is different from the third embodiment in the following points. The loop termination condition establishment signal (PS2) is sent to the selector 13B and the adder 12C of the third-loop counter 22C.

When the initial value signal (INIT) is asserted, or when both the termination condition establishment signal (PS1) of the loop A and the termination condition establishment signal (PS2) of the loop B are asserted, the selector 13B outputs the initial value (sInit2) to the storage unit 11B.

The third-loop counter 22C includes a storage unit 11C, a selector 13C, an adder 12C, and a comparator 14C.

The storage unit 11C stores a counter value (sCnt3) of the loop variable of the loop C. When the write enable signal WE is asserted, the storage unit 11C updates the counter value (sCnt3) according to the output signal of the selector 13C.

The selector 13C stores an initial value (sInit3). The selector 13C outputs the initial value (sInit3) to the storage unit 11C when the initial value signal (INIT) is asserted. The selector 13C outputs the output signal of the adder 12C to the storage unit 11C when the initial value signal (INIT) is not asserted. The initial value (sInit3) is, for example, "0".

The adder 12C stores an increment (sInc3). The adder 12C adds the output (sCnt3) and the increment (sInc3) of the storage unit 11C when both the termination condition establishment signal (PS1) of the loop A and the termination condition establishment signal (PS2) of the loop B are asserted. The increment (sInc3) is, for example, "1".

The comparator 14C stores a maximum value (sMax3). The comparator 14C compares the counter value (sCnt3) with the maximum value (sMax3). The comparator 14C asserts the loop termination condition establishment signal (PS3) when the counter value (sCnt3) reaches the maximum value (sMax3). The loop termination condition establishment signal (PS3) is sent to the state transition controller 50.

Fourth Embodiment

Figure 15:
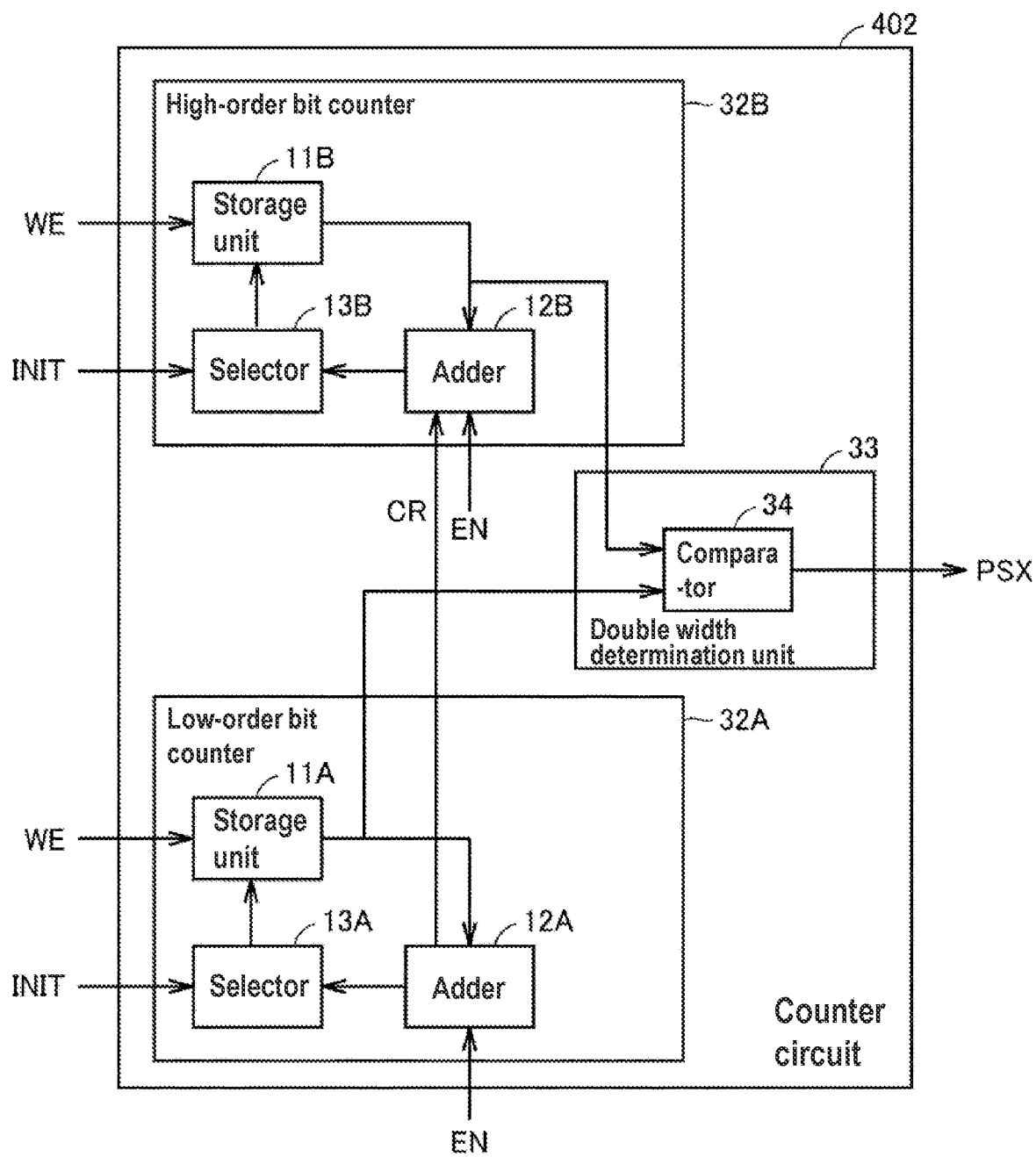
FIG. 15 is a block diagram illustrating components of the counter circuit 402 according to the fourth embodiment.

FIG. 15 is a block diagram illustrating components of the counter circuit 402 according to the fourth embodiment. The counter circuit 402 counts loop variables that are twice the width of the loop. The double bit width is, for example, 32 bits.

The counter circuit 402 includes a counter 32A for lower bits for counting lower bits of the loop variable, a counter 32B for higher bits for counting higher bits of the loop variable, and a double width determination unit 33. The double width determination unit 33 determines whether the loop-termination condition is satisfied based on the value of the counter 32A for the lower bit and the value of the counter 32B for the upper bit. The lower bits are the lower 16 bits of the 32-bit loop variable. The upper bits are the upper 16 bits of the 32-bit loop variable.

The low-order bit counter 32A outputs the carry-signal CR to the high-order bit counter 32B when the low-order bit of the loop-variable exceeds the maximum value. The high-order bit counter 32B increments the high-order bit of the loop-variable when receiving the carry-signal CR.

The lower-bit counter 32A includes a storage unit 11A, a selector 13A, an adder 12A, and a comparator 14A. These components are for 16 bits.

The high-order-bit counter 32B includes a storage unit 11B, a selector 13B, an adder 12B, and a comparator 14B. These components are for 16 bits.

The storage unit 11A stores a counter value (sCnt1) of the lower-bit of the loop-variable. When the write enable signal WE is asserted, the storage unit 11A updates the counter value (sCnt1) according to the output signal of the selector 13A.

The selector 13A stores an initial value (sInit1). The selector 13A outputs an initial value (sInit1) to the storage unit 11A when the initial value signal (INIT) is asserted. The selector 13A outputs the output signal of the adder 12A to the storage unit 11A when the initial value signal (INIT) is not asserted. The initial value (sInit1) is, for example, "0".

The adder 12A stores an increment (sInc1). When the addition instruction signal (EN) is asserted, the addition unit 12A adds the output (sCnt1) of the storage unit 11A and the increment (sInc1). The increment (sInc1) is, for example, "1". The adder 12A asserts the carry-signal CR when a carry occurs (that is, when the added value exceeds "0xFFFF").

The storage unit 11B stores a counter value (sCnt2) of a higher-order bit of the loop-variable. When the write enable signal WE is asserted, the storage unit 11B updates the counter value (sCnt2) according to the output signal of the selector 13B.

The selector 13B stores an initial value (sInit2). The selector 13B outputs the initial value (sInit2) to the storage unit 11B when the initial value signal (INIT) is asserted. The selector 13B outputs the output signal of the adder 12B to the storage unit 11B when the initial value signal (INIT) is not asserted. The initial value (sInit2) is, for example, "0".

The adder 12B stores an increment (sInc2). When the carry signal CR is asserted, the addition unit 12B adds the output (sCnt2) of the storage unit 11B and the increment (sInc2). The increment (sInc2) is, for example, "1".

The double width determination unit 33 includes a comparator 34.

The comparator 14 stores a maximum value (sMax). The comparator 14 compares a value (for example, 32 bits) obtained by setting the counter value (sCnt1) from the storage unit 11A as the lower bit and the counter value (sCnt2) from the storage unit 11B as the upper bit with the maximum value (sMax). The comparator 14 compares a value (for example, 32 bits) obtained by setting the counter value (sCnt1) from the storage unit 11A as the lower bit and the counter value (sCnt2) from the storage unit 11B as the upper bit with the maximum value (sMax). The comparator 34 asserts the loop termination condition establishment signal (PSX) when the counter value (sCnt2) reaches the maximum value (sMax). The loop termination condition establishment signal (PSX) is sent to the state transition controller 50. sMax2 is, for example, "0xFFFFFFFF".

Modified Example of the Fourth Embodiment

Figure 16:
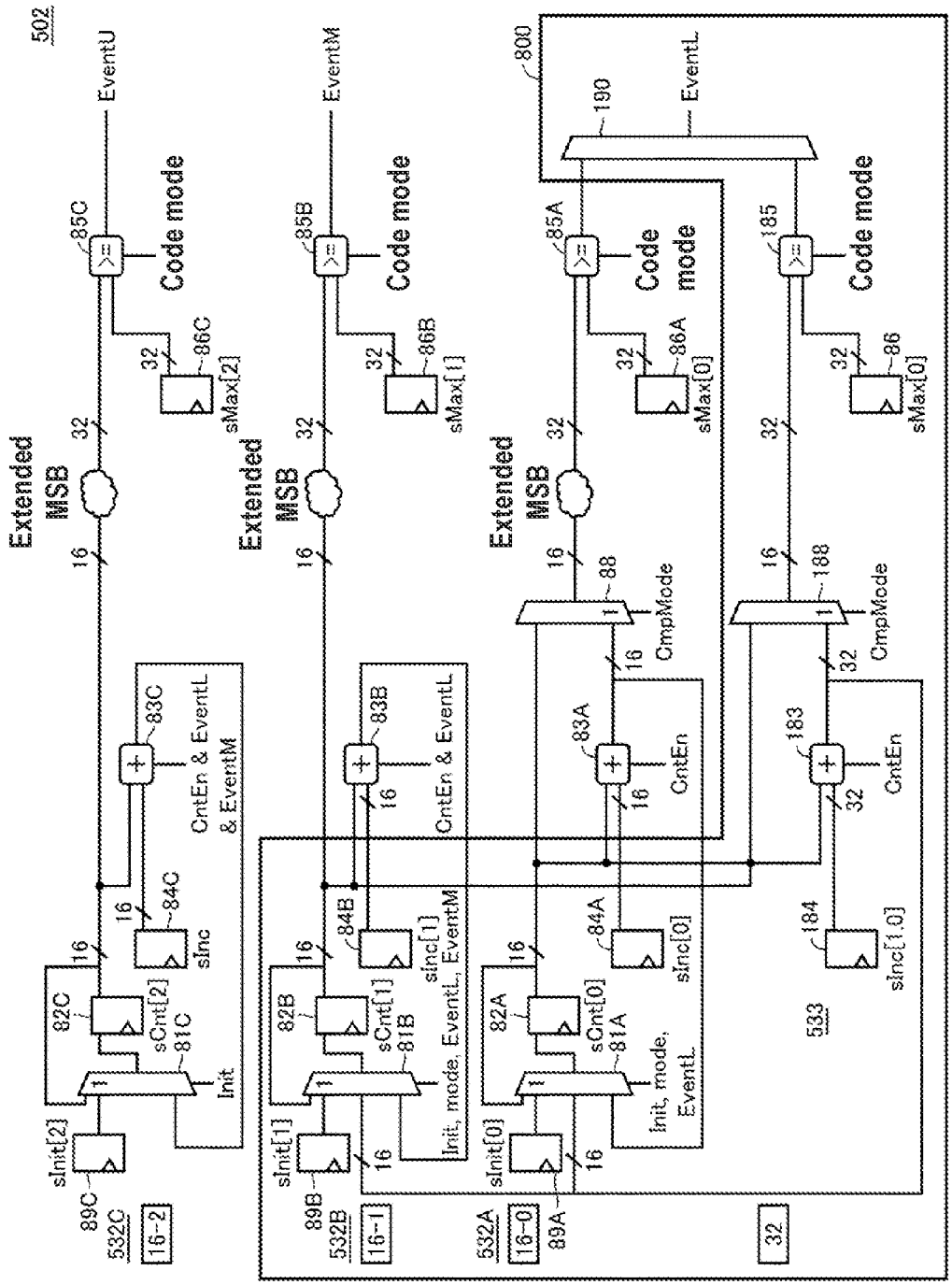
FIG. 16 is a diagram illustrating a configuration of the counter circuit 502 of modified example according to the fourth embodiment.

FIG. 16 is a diagram illustrating a configuration of the counter circuit 502 of modified example according to the fourth embodiment.

The counter circuit 502 counts loop variables of loop A and loop B outside one of loop A and loop C outside one of loop B in a first mode and counts loop variables of double bit width of loop D in a second mode.

The counter circuitry 502 includes a first counter 532A, a second counter 532B, a third counter 532C, a double width determination unit 533, and a selector 190. In FIG. 16, block 800 represents the components performed in the second mode.

The first counter 532A counts the loop variable of loop A in the first mode and counts the lower bits of the loop variable of loop D in the second mode.

The second counter 532B counts the loop variable of loop B in the first mode and counts the upper bits of the loop variable of loop D in the second mode.

The third counter 532C counts the loop variable of the loop C in the first mode.

In the second mode, the double width determination unit 533 determines whether the termination condition of the loop D is satisfied based on the value of the first counter 532A and the value of the second counter 532B. In the second mode, the double width determination unit 533 asserts the condition fulfillment EventL to the state transition controller 50 when the condition for terminating the loop D is satisfied.

In the first mode, the first counter 532A asserts a condition fulfillment EventL to the second counter 532B when the termination condition of loop A is satisfied.

The second counter 532B increments the loop variable of loop B in the first mode when the conditional EventL is asserted.

The second counter 532B asserts, in the first mode, a condition fulfillment EventM to the third counter 532C when the termination condition of loop B is satisfied.

The third counter 532C increments the loop variable of loop C in the first mode when the condition fulfillment signal EventL is asserted and the condition fulfillment signal EventM is asserted.

The third counter 532C asserts, in the first mode, the condition fulfillment EventU to the state transition controller 50 when the termination condition of the loop C is satisfied.

The first counter 532A includes a register 89A, a selector 81A, a register 82A, a register 84A, an adder 83A, a selector 88, a register 86A, and a comparator 85A.

The register 89A stores the initial value sInit(0).

The selector 81A outputs an initial value sInit(0) when the initial value signal Init is asserted. The selector 81A outputs the initial value sInit(0) when EventL is asserted. The selector 81A outputs the counter value sCnt(0) of the register 82A when the initial value signal Init is not asserted and the mode signal mode is asserted in the first mode. The selector 81A outputs the adder 83A when the initial value signal Init is not asserted, and the mode signal mode is not asserted in the first mode. In the second mode, the selector 81A outputs the lower 16 bits of the 32-bit output of the adder 183 of the double width determination unit 533.

The register 82A stores the output of the selector 81A as the counter value sCnt(0).

The register 84A stores the increment sInc(0).

The adder 83A adds the output of the register 82A and the output of the register 84A when the addition instruction signal CntEn is asserted.

The selector 88 outputs the output of the adder 83A when a mode CmpMode is asserted. The selector 88 outputs the output of the register 82A when the mode CmpMode is not asserted.

The register 86A stores the maximum value sMax(0).

The comparator 85A compares MSB of the output of the selector 88 with the maximum value sMax[0] based on the code mode. The comparator 85A asserts a condition establishment signal EventL when MSB of the output of the selector 88 is greater than or equal to the maximum value sMax[0].

The second counter 532B includes a register 89B, a selector 81B, a register 82B, a register 84B, an adder 83B, a register 86B, and a comparator 85B.

The register 89B stores an initial value sInit(1).

The selector 81B outputs the initial value sInit(1) when the initial value signal Init is asserted. The selector 81B outputs the initial value sInit(1) when EventL is asserted and EventM is asserted. The selector 81B outputs the counter value sCnt(1) of the register 82B when the initial value signal Init is not asserted and the mode signal mode is asserted in the first mode. The selector 81B outputs the adder 83B when the initial value signal Init is not asserted, and the mode signal mode is not asserted in the first mode. In the second mode, the selector 81B outputs the higher 16 bits of the 32-bit output of the adder 183 of the double width determination unit 533.

The register 82B stores the output of the selector 81B as the counter value sCnt(1).

The register 84B stores the increment sInc(1).

The adder 83B adds the output of the register 82B and the output of the register 84B when the addition instruction signal CntEn is asserted and the conditional signal EventL is asserted.

The register 86B stores the maximum value sMax(1).

The comparator 85B compares MSB of the output of the register 82B with the maximum value sMax(1) based on the code-mode. The comparator 85B asserts the conditional signal EventM when the signal obtained by extending MSB of the register 82B is equal to or larger than the maximum value sMax(1).

The third counter 532C includes a register 89C, a selector 81C, a register 82C, a register 84C, an adder 83C, a register 86C, and a comparator 85C.

The register 89C stores an initial value sInit[2].

The selector 81C outputs the initial value sInit[2] when the initial value signal Init is asserted. The selector 81B outputs the counter-value sCnt[2] of the register 82C when the initial value signal Init is not asserted and the mode signal mode is asserted in the first mode. The selector 81C outputs the adder 83C when the initialization signal Init is not asserted, and the mode signal mode is not asserted in the first mode.

The register 82C stores the output of the selector 81C as the counter value sCnt[2].

The register 84C stores the increment sInc[2].

The adder 83A adds the output of the register 82C and the output of the register 84C when the addition instruction CntEn is asserted and the condition establishment signal EventL is asserted and the condition establishment signal EventM is asserted.

The register 86C stores the maximum value sMax[2].

The comparator 85C compares MSB of the output of the register 82C with the maximum value sMax[2] based on the code-mode. The comparator 85C asserts the condition establishment signal EventU when the extended MSB of the register 82C is greater than or equal to the maximum value sMax[2].

The double width determination unit 533 includes a register 184, an adder 183, a selector 188, a register 86, and a comparator 185.

The register 184 stores the increment sInc[0].

In the second mode, when the addition instruction signal CntEn is asserted, the adder 183 adds the value obtained by setting the counter value sCnt[0] output from the register 82A to the lower 16 bits, and setting the counter value sCnt[1] output from the register 82B to the upper 16 bits, and the output of the register 184.

The selector 188 outputs the output of the adder 183 when the mode CmpMode is asserted. When the mode CmpMode is not asserted, the selector 188 outputs a value in which the counter value sCnt[0] output from the register 82A is set to the lower 16 bits and the counter value sCnt[1] output from the register 82B is set to the upper 16 bits.

The register 86 stores the maximum value sMax[0].

The comparator 185 compares the output of the selector 188 with the maximum value sMax[0] based on the code mode. The comparator 185 asserts the condition establishment signal EventL when the output of the selector 188 is greater than or equal to the maximum value sMax[0].

While the dedicated counter circuit is fast, there is a disadvantage in that the circuit scale increases when attempting to correspond to all nested loop descriptions. In present embodiment, by interlocking a plurality of dedicated counter circuits, a nested counter circuit can be realized even when a 32-bit counter circuit is required in all of the triple-loop descriptions, for example.

Compared with the case where all three dedicated counter circuits are converted into 32 bits, a 16-bit counter circuit is sufficient in many loop descriptions, so that present embodiment prevents an increase in delay and enables high-speed operation. In addition, according to present embodiment, it is possible to avoid an increase in area by providing a large number of dedicated counter circuits and providing wire switches for connecting the counter circuits to programmable logic.

When the dedicated counter circuit matches only a portion (for example, only the inner loop description) of the multiple loop description, the dedicated counter circuit may be used for the corresponding part, and the unmatched part may be realized by combining an operation resource such as an existing PE or LUT.

Fifth Embodiment

Figure 17:
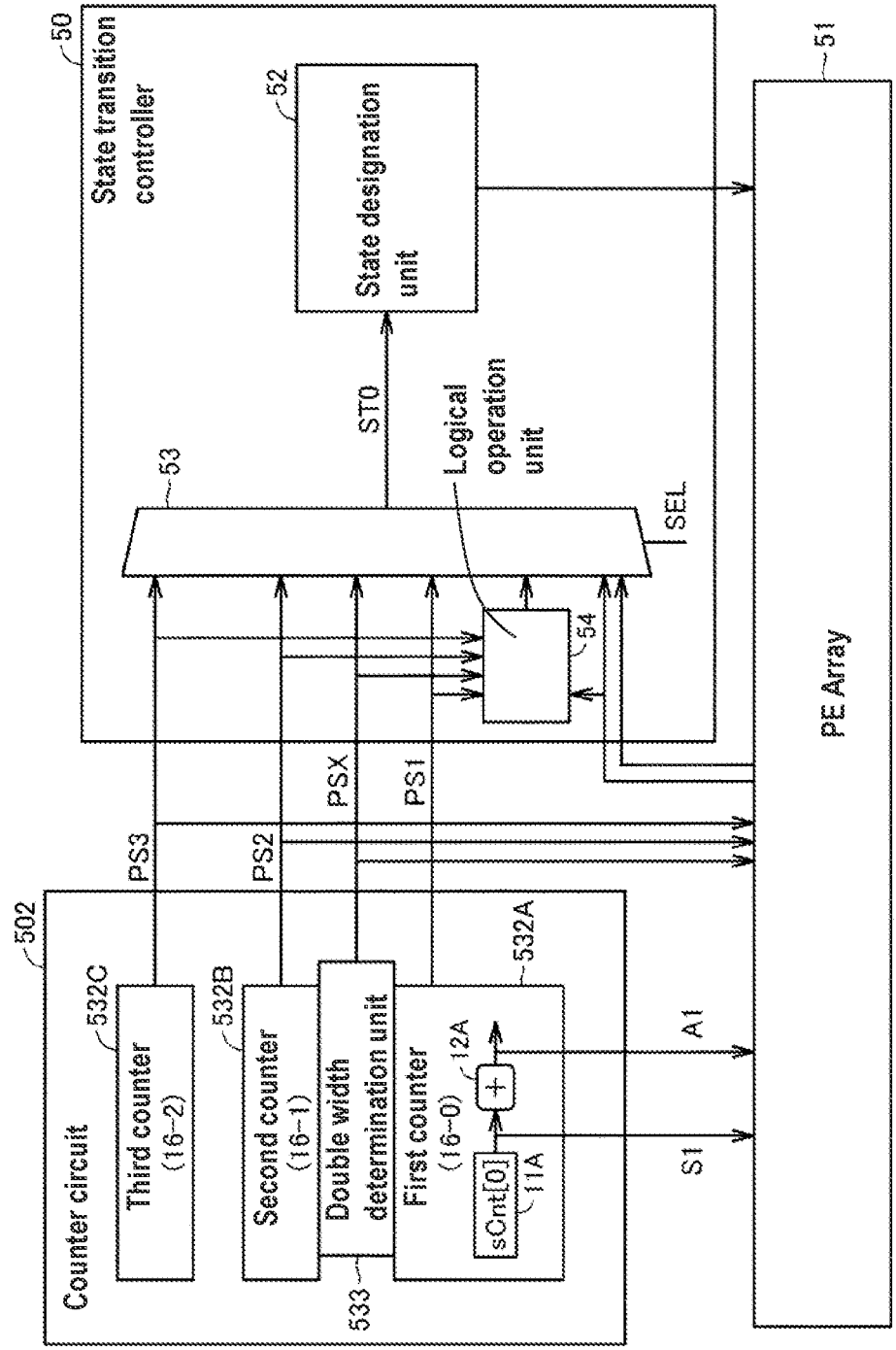
FIG. 17 is a diagram illustrating a counter circuit, a state transition controller, and a processing element array according to a fifth embodiment.

FIG. 17 is a diagram illustrating a counter circuit, a state transition controller, and a processing element array according to the fifth embodiment.

The counter circuit 502 is disposed adjacent to the state transition controller 50.

The counter circuit 502 provides the loop exit condition establishment signal PS1, PS2, PS3, PX to the state-transition-controller 50.

The state transition controller 50 includes a selector 53 and a state designation unit 52.

The selector 53 selects a signal to be used for the determination from a plurality of the loop exit condition establishment signal PS1, PS2, PS3, PX.

The state designation unit 52 determines a next state and a data path context corresponding to each state according to the selected signal.

By placing the counter circuitry 502 in a position proximate to the state transition controller 50, the loop exits condition establishment signal PS1, PS2, PS3, PX may be sent directly to the state transition controller 50 without passing through the processing element array 51. As a result, the delay time can be shortened, and the operation can be performed at high speed.

On the other hand, in the process of referring to the value of the loop variable by the counter circuit 502 in the loop, there is a process performed only at a timing when the loop exit condition is satisfied, or a process performed while the loop exit condition is not satisfied. The value referred to at this time is a value before addition or a value after addition, depending on how the program is written.

In present embodiment, the output Si of the storage unit 11A of the first counter 532A and the output A1 of the adder 12 are output to the processing element array 51. The processing element array 51 can use both the output Si of the storage unit 11A and the output A1 of the adder 12.

For the second counter 532B and the third counter 532C, the output of the storage unit and the output of the addition unit may be output to the processing element array 51.

First Modified Example of Fifth Embodiment

Figure 18:
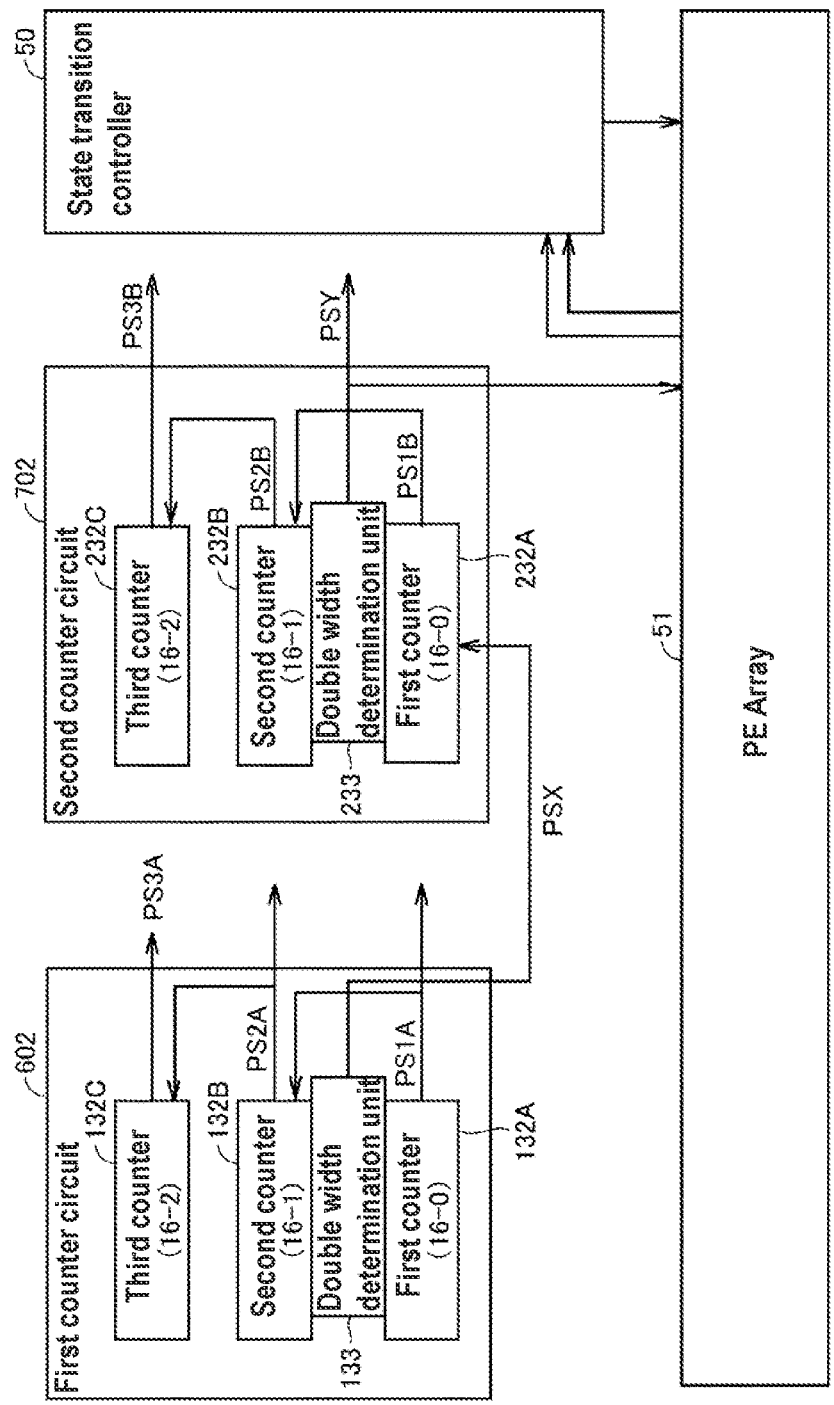
FIG. 18 is a diagram illustrating a counter circuit, a state transition controller, and a processing element array of first modified example according to the fifth embodiment.

FIG. 18 is a diagram illustrating a counter circuit, a state-transition controller, and a processing element array of first modified example according to the fifth embodiment.

The first counter circuit 602 and the second counter circuit 702 cooperatively correspond to a nested loop.

The first counter circuit 602 and the second counter circuit 702 correspond to multiple loops in a 16-bit variable, but only one loop in a 32-bit variable. The first counter circuit 602 and the second counter circuit 702 may be interlocked to correspond to multiple loops.

In the first mode, the first counter circuit 602 counts loop variables of multiple loops consisting of loop A, loop B outside one of loop A, and loop C outside one of loop B. The second counter circuit 702 counts, in the first mode, a loop variable of a multiple loop consisting of loop D, loop E outside one of loop D, and loop F outside one of loop E.

The first counter circuit 602 counts, in a second mode, a loop variable that is twice as wide as the loop G inside the double loop. In the second mode, the second counter circuit 702 counts loop variables that are twice the width of the loop H outside one of the loops G.

The first counter circuitry 602 includes a first counter 132A, a second counter 132B, a third counter 132C, and a double width determination unit 133.

The first counter 132A counts the loop variable of loop A in the first mode and counts the lower bits of the loop variable two times the width of loop G in the second mode.

The second counter 132B counts the loop variable of the loop B in the first mode, and in the second mode counts the upper bits of the loop variable two times the width of the loop G.

The third counter 132C counts the loop variable of the loop C in the first mode.

The first counter 132A outputs a condition establishment signal PS1A to the second counter 132B in the first mode when the termination condition of loop A is satisfied.

The second counter 132B increments the loop variable of loop B when receiving the condition establishment signal PS1A in the first mode. The second counter 132B outputs the condition establishment signal PS2A to the third counter 132C in the first mode when the termination condition of loop B is satisfied.

The third counter 132C increments the loop variable of loop C when receiving the condition establishment signal PS2A in the first mode. The third counter 132C outputs a condition establishment signal PS3A to the state-transition controller 50 in the first mode when the termination condition of the loop C is satisfied.

The first counter 132A outputs a condition establishment signal PS1A to the second counter 132B when, in the second mode, the low-order bits of the loop variable of the loop G exceed a maximum value.

In the second mode, the second counter 132B increments the upper bit of the loop variable of the loop G when the condition establishment signal PS1A is received.

In the second mode, the double width determination unit 133 determines whether or not the end condition of the loop G is satisfied based on the value of the first counter 132A and the value of the second counter 132B, and outputs a condition establishment signal PSX when the end condition of the loop G is satisfied.

The second counter circuitry 702 includes a first counter 232A, a second counter 232B, a third counter 232C, and a double width determination unit 233.

The first counter 232A counts the loop variable of the loop D in the first mode and counts the lower bits of the loop variable two times the width of the loop H in the second mode.

The second counter 232B counts the loop variable of the loop E in the first mode, and in the second mode counts the upper bits of the loop variable of twice the bit width of the loop H.

The third counter 232C counts the loop variable of the loop F in the first mode.

The first counter 232A outputs a condition establishment signal PS1B to the second counter 232B when the end-condition of the loop D is satisfied in the first mode.

The second counter 232B increments the loop variable of loop E when receiving the condition establishment signal PS1B in the first mode. The second counter 232B outputs a condition establishment signal PS2B to the third counter 232C when the end-condition of loop E is satisfied in the first mode.

The third counter 232C increments the loop variable of the loop F when receiving the condition establishment signal PS2B in the first mode. The third counter 232C outputs a condition establishment signal PS3B to the state-transition controller 50 in the first mode when the termination condition of the loop F is satisfied.

The first counter 232A increments, in the second mode, the low-order bits of the loop variable of the loop H when the condition establishment signal PSX is received.

The first counter 232A outputs a condition establishment signal PS1B to the second counter 232B when in the second mode the low-order bits of the loop variable of the loop H exceed the maximum value.

In the second mode, the second counter 232B increments the upper bit of the loop variable of the loop H when the condition establishment signal PS1B is received.

In the second mode, the double width determination unit 233 determines whether or not the end condition of the loop H is satisfied based on the value of the first counter 232A and the value of the second counter 232B, and outputs a the condition establishment signal PSY when the end condition of the loop H is satisfied.

Second Modified Example of Fifth Embodiment

Figure 19:
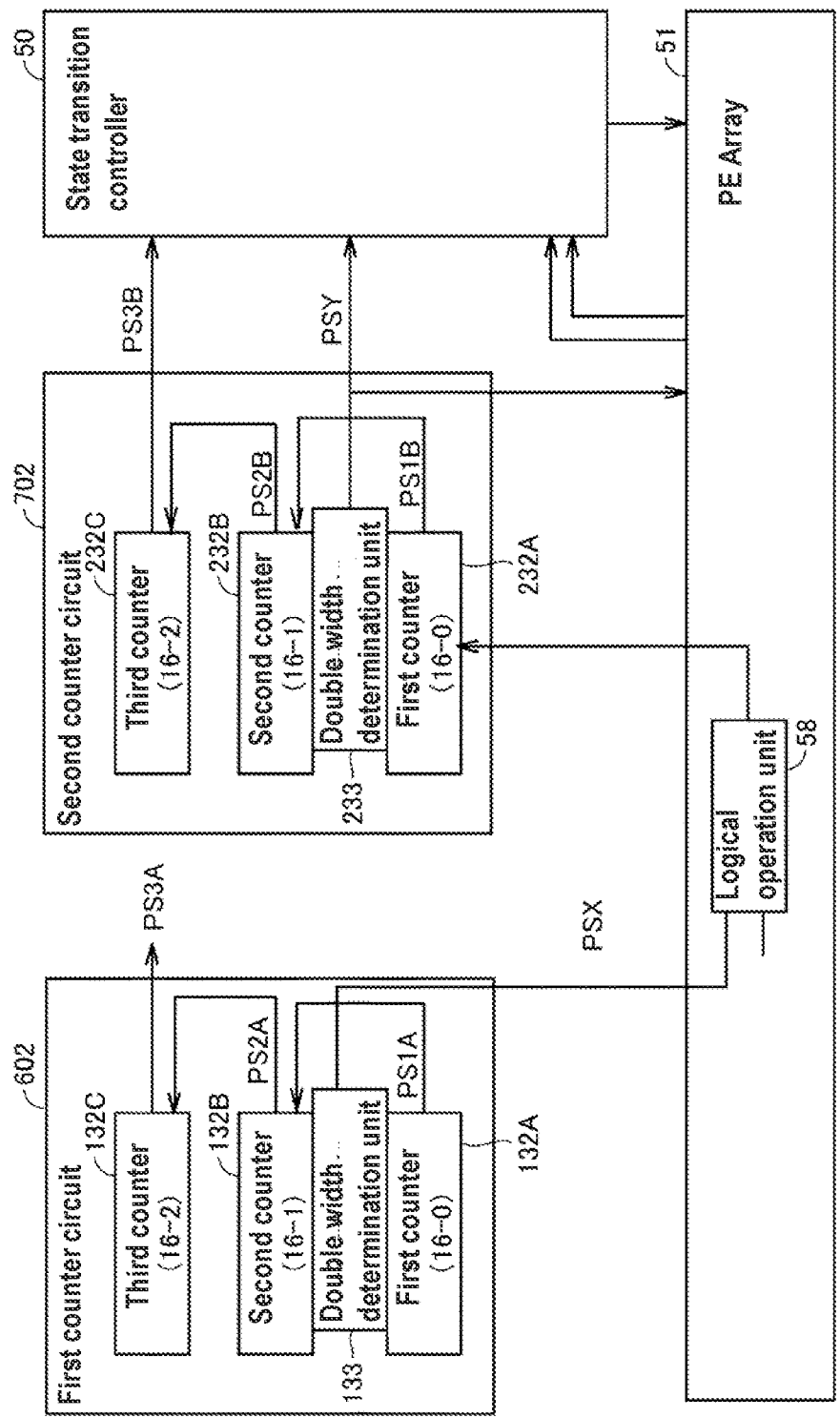
FIG. 19 is a diagram illustrating a counter circuit, a state transition controller, and a processing element array of second modified example according to the fifth embodiment.

FIG. 19 is a diagram illustrating a counter circuit, a state-transition controller, and a processing element array of second modified example according to the fifth embodiment.

In the second mode, the second counter circuit 702 counts loop variables that are twice the width of the loop B outside one of the loops A.

The first counter circuit 602 outputs a loop exit condition establishment signal PSX to the processing element array 51 when the end-of-loop A is satisfied.

At least one processing element PE of the processing element array 51 performs a logical operation based on the loop exit condition establishment signal PSX, and outputs an increment indication signal to the second counter circuit 702 when the result of the logical operation satisfies a predetermined condition.

When receiving the increase instruction signal, the second counter circuit 702 increments the loop variable of the loop B. The second counter circuit 702 outputs a loop exit condition establishment signal PSY to the state-transition-controller 50 when the end-condition of loop-B is satisfied.

Sixth Embodiment

Figure 20:
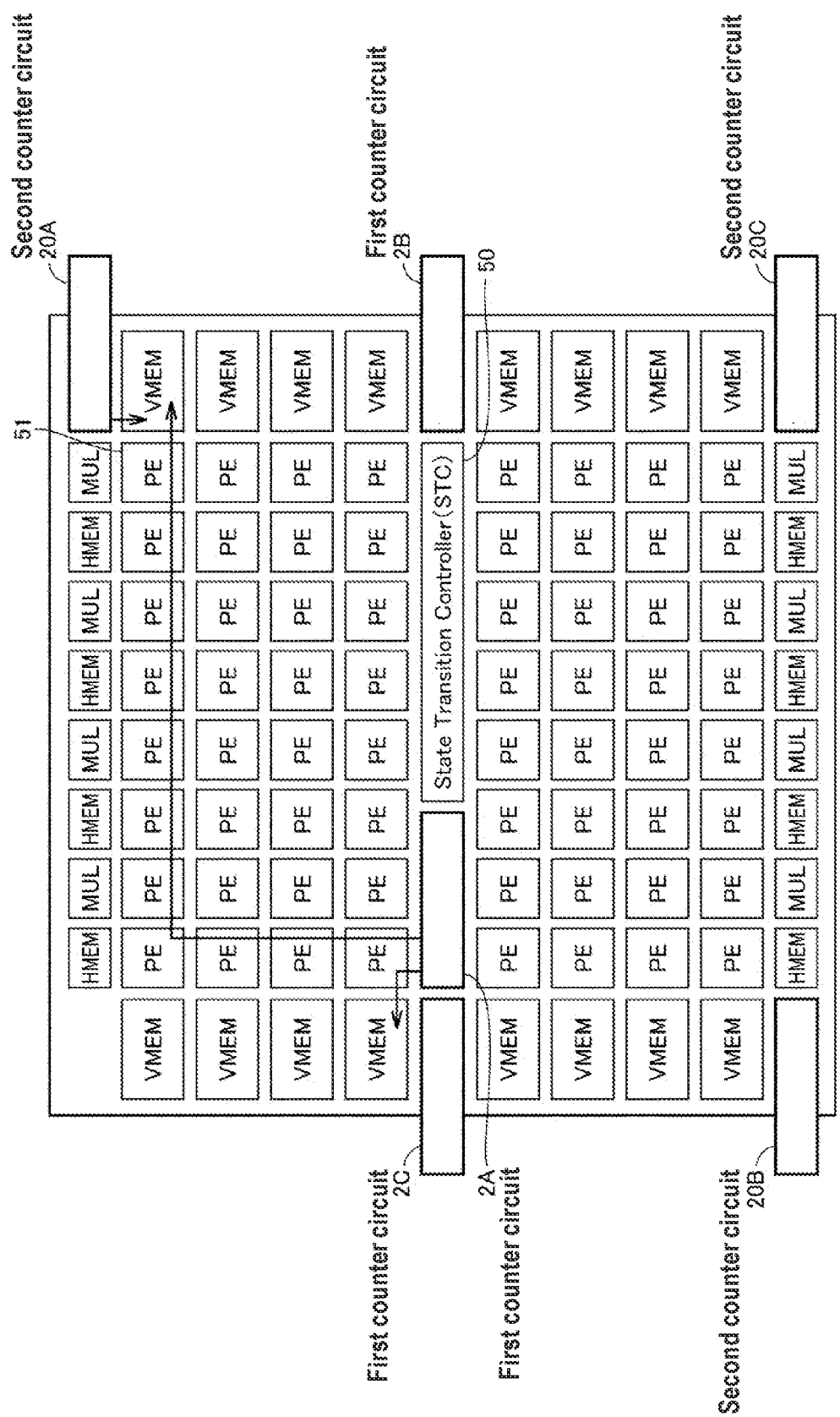
FIG. 20 is a diagram illustrating a configuration of a Dynamically reconfigurable processor according to a sixth embodiment.

FIG. 20 is a diagram illustrating a configuration of a Dynamically Reconfigurable Processor according to the sixth embodiment.

Dynamically Reconfigurable Processor comprises first counter circuits 2A, 2B, 2C and second counter circuits 20A, 20B, 20C.

The second counter circuits 20A, 20B, 20C are copy counters of the first counter circuits 2A, 2B, 2C.

The first counter circuit 2A counts the variable A. The first counter circuit 2B counts the variable B. The second counter circuit 20C counts the variable C.

The first counter circuit 2A and the second counter circuit 20A can both simultaneously or only one can count A. The first counter circuit 2B and the second counter circuit 20B can both simultaneously or only one can count the variable B. The first counter circuit 2C and the second counter circuit 20C can both simultaneously or only one can count the variable C.

The first counter circuits 2A, 2B, 2C are located in the vicinity of the state-transition-controller 50. The output of the first counter circuits 2A, 2B, 2C are sent to the state-transition-controller 50 and used for the control of Dynamically Reconfigurable Processor.

The second counter circuits 20A, 20B, 20C are arranged in the vicinity of the memories VMEM, HMEM. Since the memories VMEM, HMEM are located away from the first counter circuits 2A, 2B, 2C and the state-transition controller 50, attempts to provide memories VMEM, HMEM with the loop exit condition establishment signal or variable-counters from the first counter circuits 2A, 2B, 2C require wires to pass through PE arrays 51, resulting in a large delay.

The second counter circuits 20A, 20B, 20C may reduce the delay by providing the loop exit condition establishment signal or a variable-value counter to the vicinity memories VMEM, HMEM.

In the example of FIG. 20, the counter circuit is not arranged in the upper left corner, but the second counter circuit may be arranged.

Modified Example of Sixth Embodiment

The escape the condition establishment signal PS can be used to enable a process that is performed only at the timing when the loop escape condition is satisfied. On the other hand, the escape the condition establishment signal PS must be reversed for the process to be performed while the loop-escape condition is not satisfied. For example, a signal indicating the write enable of the register may be asserted while the loop exit condition is not satisfied.

It is conceivable to invert the escape the condition establishment signal PS in the processing element array 51, but there is a disadvantage in that an arithmetic unit is used and the delay is increased. Such an issue can be avoided by the counter circuit outputting the inverted escape the condition establishment signal PS.

FIG. 21 is a diagram illustrating a configuration of a modified example counter-circuit 2X according to a sixth embodiment. The counter circuit 2X is different from the counter circuit 2 of the first embodiment in that the counter circuit 2X includes an inverting unit 114.

The inverting unit 114 generates an inverting the loop exit condition establishment signal /PS by inverting the loop exit condition establishment signal PS, and outputs the inverted the loop exit condition establishment signal /PS. The inverting unit 114 is constituted by, for example, an inverter.

Figure 22:
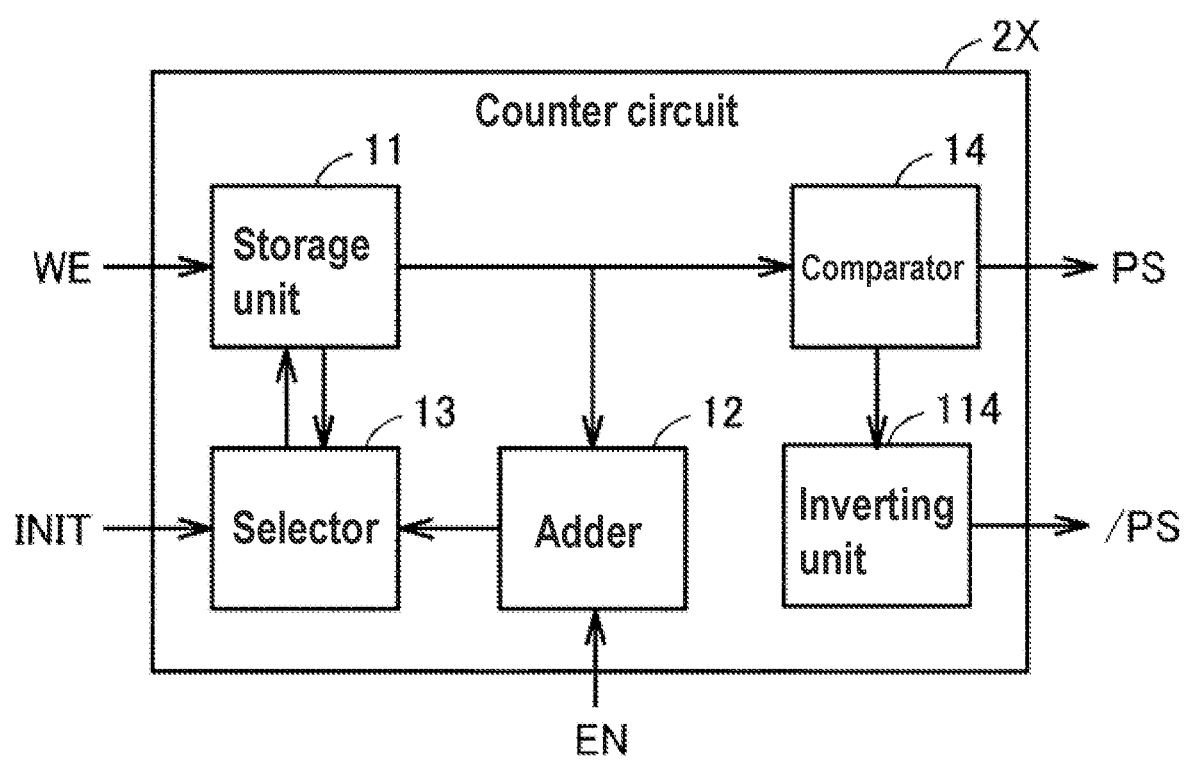
FIG. 22 is a diagram illustrating an exemplary programming in which an termination condition establishment signal PS and an inverted termination condition establishment signal /PS are used.

FIG. 22 illustrates an exemplary programming in which the escape the condition establishment signal PS and the inverted escape conditional-signal /PS are utilized.

For writing to array in the inner loop, since the writing is enabled when the inner loop is not escaped, the signal/PS obtained by inverting the escape the condition establishment signal PS can be used as a signal indicating the write enable to the register for array.

This eliminates the need to separately provide a general-purpose arithmetic unit for signal inversion between the counter circuit and the memory.

For writing to array2 after the inner-loop escape, the escape the condition establishment signal PS can be used as a write enable command to the register for array2.

Seventh Embodiment

The counter circuit can be used as follows. The counter circuit can also be utilized in the calculation inside the loop. The accumulator, which adds the values supplied from the others to a register each time, can also be constructed in the processing element PE. However, since it is necessary to connect the register and the adder to each other in a programmable wiring manner to form a loop starting from the register and ending from the register, there is a problem that the delay becomes large.

Figure 23:
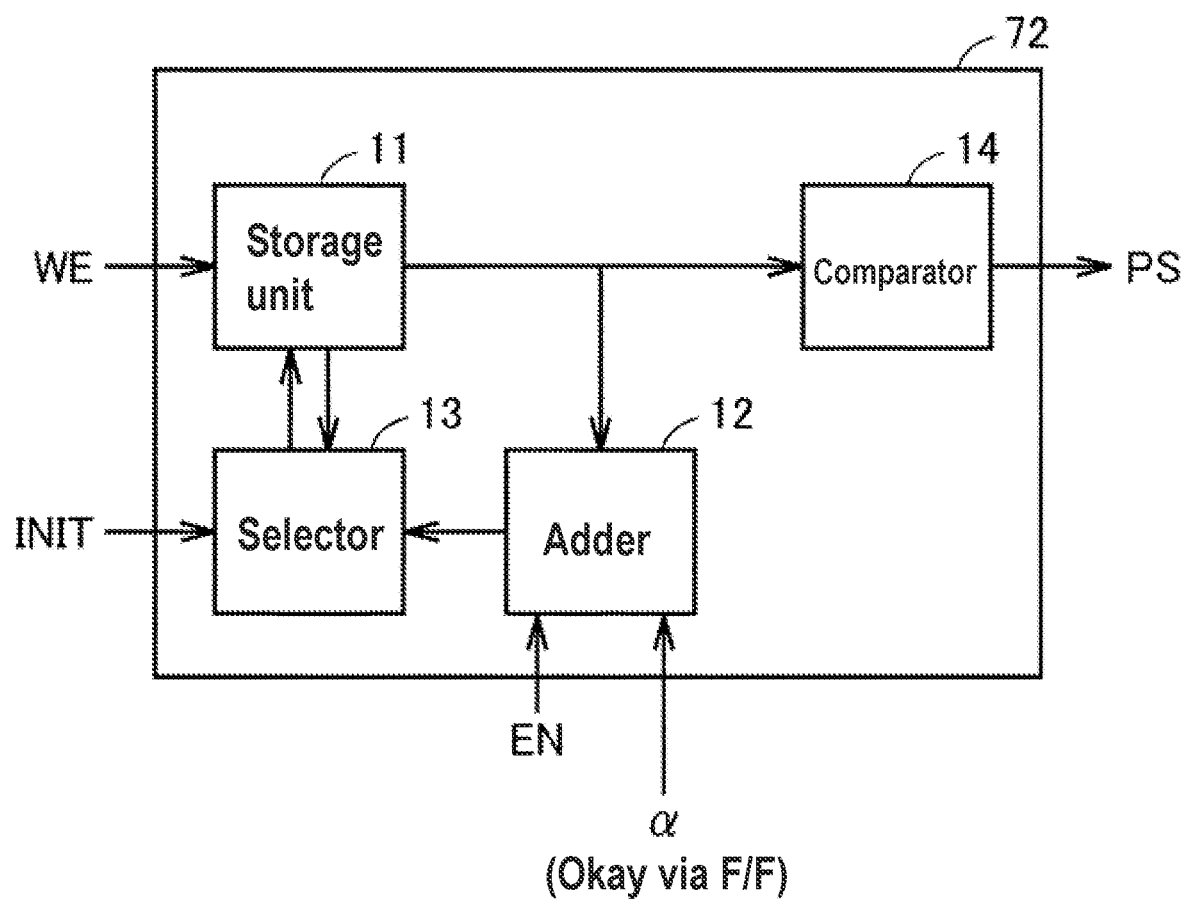
FIG. 23 is a block diagram illustrating components of the counter circuit 72 according to a seventh embodiment.

FIG. 23 is a block diagram illustrating components of the counter circuit 72 according to the seventh embodiment.

The counter circuit 72 counts an accumulator variable in which the increment is repeatedly added in the loop.

Similarly, to the counter circuit 2 described in the first embodiment, the counter circuit 72 includes a storage unit 11, a selection unit 134, an addition unit 12, and a comparator 14.

Figure 24:
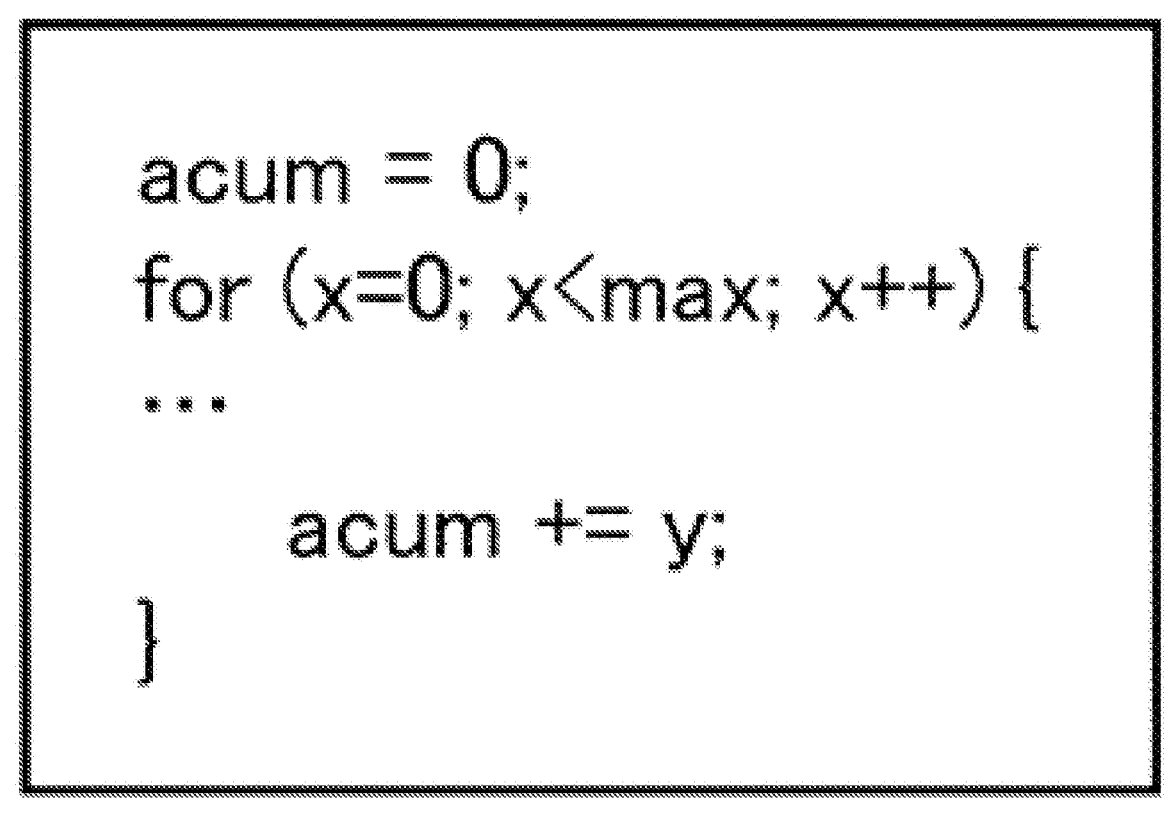

FIG. 24 is a diagram illustrating an example of a program using an accumulator.

In the program of FIG. 24, the accumulator variable acum self-references and performs accumulation (accumulator) inside the loop description by for statement. For example, such an accumulator is required when calculating an average of pixel values in an image region.

The increment a inputted to the adder 12 may be given from the processing element PE. As a result, the processing circuit inside the loop can be a fixed circuit. As for the portion to which the increment a is input, the delay amount can be suppressed by inserting a pipeline register.

The adder of the adder 12 can also be used as a floating-point accumulator by associating the adder with a floating-point. Since floating point arithmetic generally has a larger delay than integer arithmetic, the amount of delay can be reduced by using the counter circuit 72.

Eighth Embodiment

In image processing, a place to be processed is moved by moving the position of a point on a two-dimensional plane using double nested loop descriptions in the x-direction and the y-direction. The convolution process in AI may further include a process in the z-direction. When such image processing and convolution in AI are processed by dedicated logic, programmable logic, or the like, it is conceivable to pipeline the circuitry as a way to obtain high throughput.

However, if the delay of the pipeline circuit is shortened and speeded up, there is a problem that the counter circuit becomes a critical path (a path of the maximum delay, that is, a portion which is a bottleneck in increasing the operating frequency). In particular, if the loops are nested and multiplexed, the counter circuit is more likely to be a critical path.

Such a problem can be solved by making the counter circuit dedicated as described in the above embodiment.

Present embodiment describes a Dynamically Reconfigurable Processor, a compilation method thereof, a synthesis of pipelined circuits, a method of mapping counter circuits, and examples thereof.

The compiler of present embodiment generates code to be executed by Dynamically Reconfigurable Processor including the counter-circuit described in the above-described embodiment.

Figure 25:
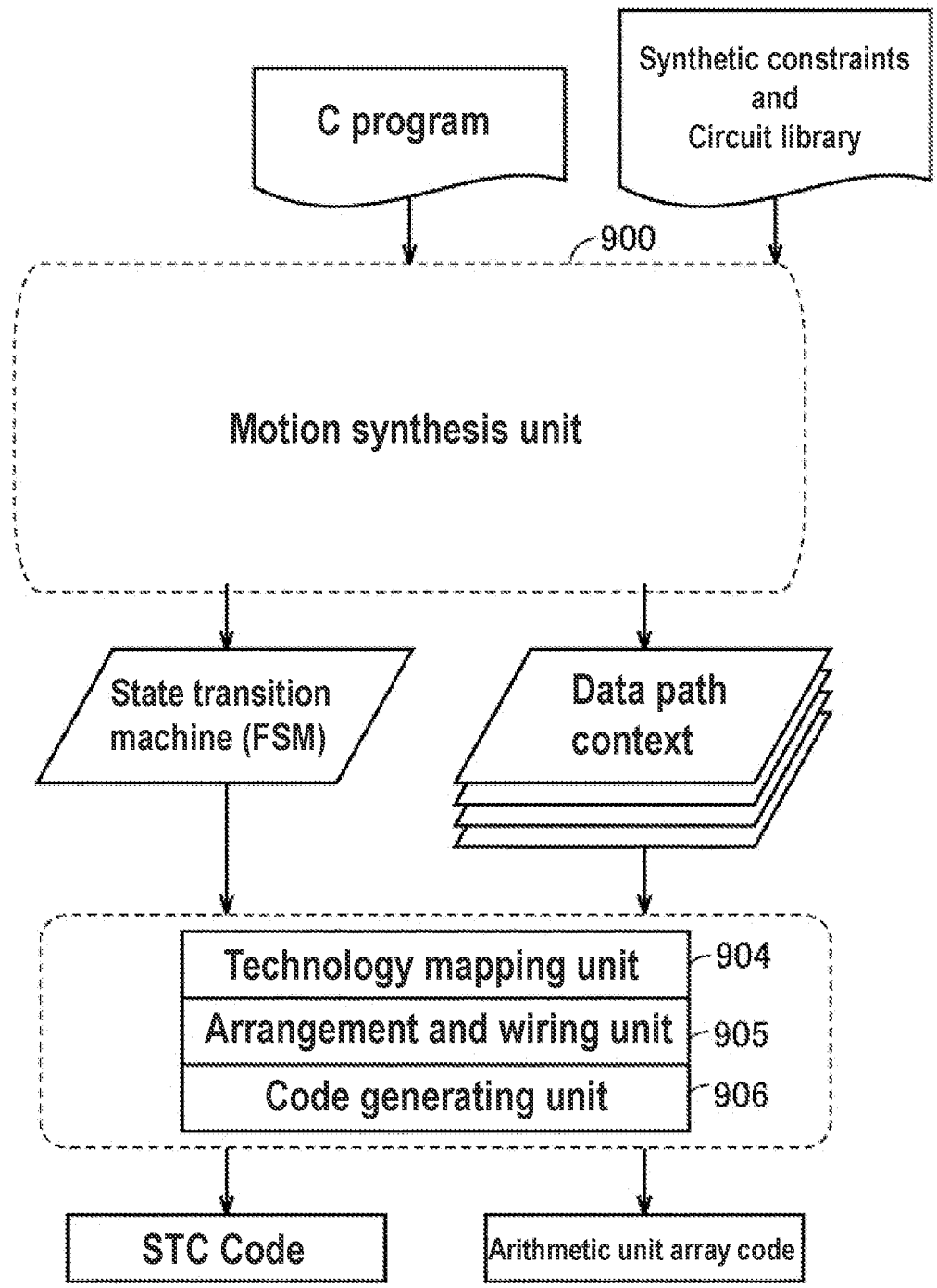
FIG. 25 is a diagram illustrating a configuration of a compiler.

FIG. 25 is a diagram illustrating a configuration of a compiler.

The compiler includes a motion synthesis unit 900, a technology mapping unit 904, an arrangement and routing unit 905, and a code generation unit 906.

Motion synthesis unit 900 generates a state transition machine (FSM) to be assigned to the state transition controllers 50, and a data path context that is circuitry corresponding to the respective states.

Motion synthesis unit 900 generates a state transition machine (FSM) and a data path context corresponding to the states of the state transition machine based on synthetic constraints such as a program described by an operation description language such as C language, a circuit library including delay information, an operation frequency, and a circuit scale.

Motion synthesis unit 900 extracts the dedicated counter-circuit described in the above-described embodiment at the time of data flow analysis. Since the dedicated counter circuit can be considered in scheduling motion synthesis, it is easy to manage the number of resources and delay of the counter circuit.

The technology mapping unit 904 performs optimization such as logical combining, and a mapping process according to the operation bit-width of PE.

An arrangement and wiring unit 905 determines the positions of the arithmetic unit, the register, and the memory, and connects the programmable wiring.

A code generating unit 906 generates a configuration code for the state transition controllers (STC) and a configuration code for PE arrays.

Figure 26:
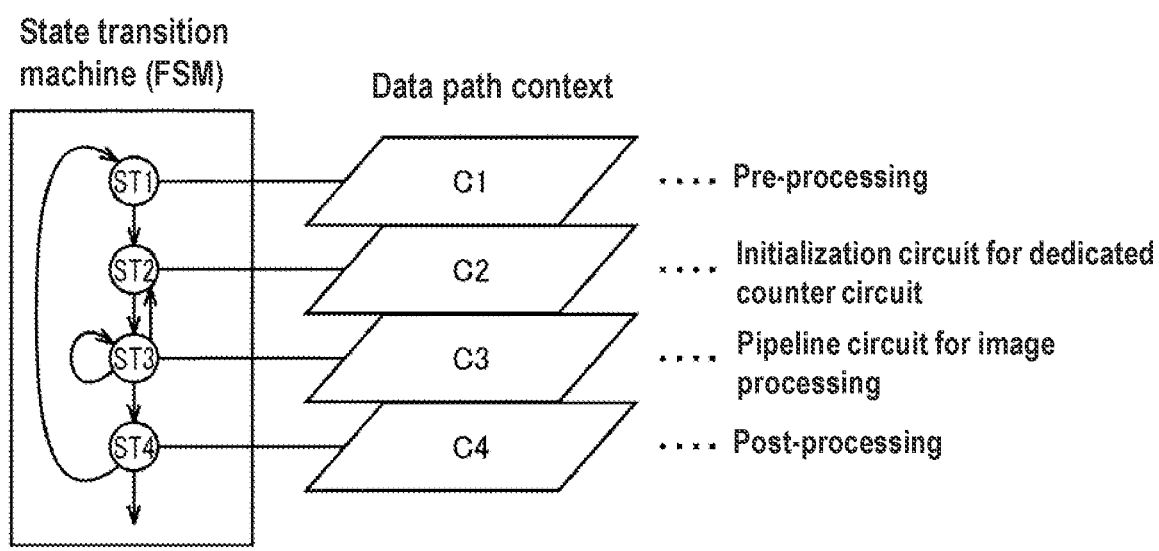
FIG. 26 is a diagram illustrating an exemplary state-transition machine and a data path context generated by motion synthesis unit 900.

FIG. 26 is a diagram illustrating an exemplary state-transition machine and a data path context generated by motion synthesis unit 900.

By leveraging circuit switching, Dynamically Reconfigurable Processor can move only the required part contextually without mixing the circuit of a plurality of conditions and the initial value circuit. For example, in the image processing, Dynamically Reconfigurable Processor switches between a pipeline circuit for image processing in the inner loop, a register initial value circuit for setting the dedicated counter circuit, another pre-processing, and post-processing. These are assigned to the datapath contexts of Dynamically Reconfigurable Processor, and the state-transition machine switches the datapath contexts according to the imaging area.

Figure 27:
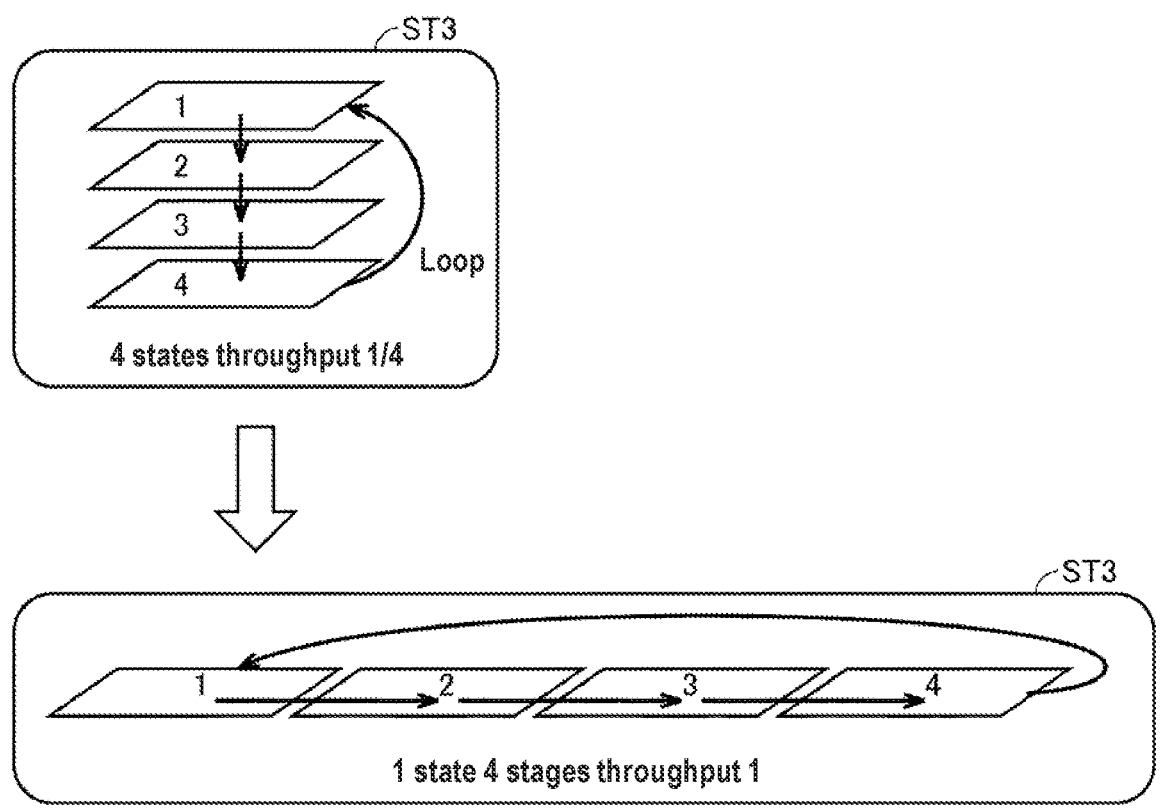
FIG. 27 is a diagram illustrating an exemplary pipeline generated during motion synthesis.

FIG. 27 is a diagram illustrating an exemplary pipeline generated during motion synthesis.

Motion synthesis unit 900 pipelines the processing inside the innermost loop in order to improve the processing throughput. After generating the dataflow graph, motion synthesis unit 900 constrains and schedules resources such as an arithmetic unit for pipelining. At this time, in order to avoid data hazards, motion synthesis unit 900 performs register forwarding or the like, and then performs pipelining to collapse a plurality of states and synthesize them as pipeline circuits. At this time, in order to avoid data hazards, motion synthesis unit 900 performs register forwarding or the like, and then performs pipelining to collapse a plurality of states and synthesize them as pipeline circuits.

FIG. 27 shows an example in which four-state circuits are folded into one context as four-stage circuits in one state, thereby improving the throughput by four times.

Processing in the loop can improve throughput by pipelining as described above. In pipelining, delays can be reduced by inserting registers or F/F in the middle of the operation.

However, the loop descriptions of the inner and outer loops are prone to performance bottlenecks because they cannot be pipelined. Especially in the case of a nested loop, since it is necessary to interlock a plurality of counter circuits, it is difficult to increase the operating frequency. Therefore, motion synthesis unit 900 maps the description of the multiple loop to the dedicated counter-circuit corresponding to the multiple loop described in the above-described embodiment.

Figure 28:
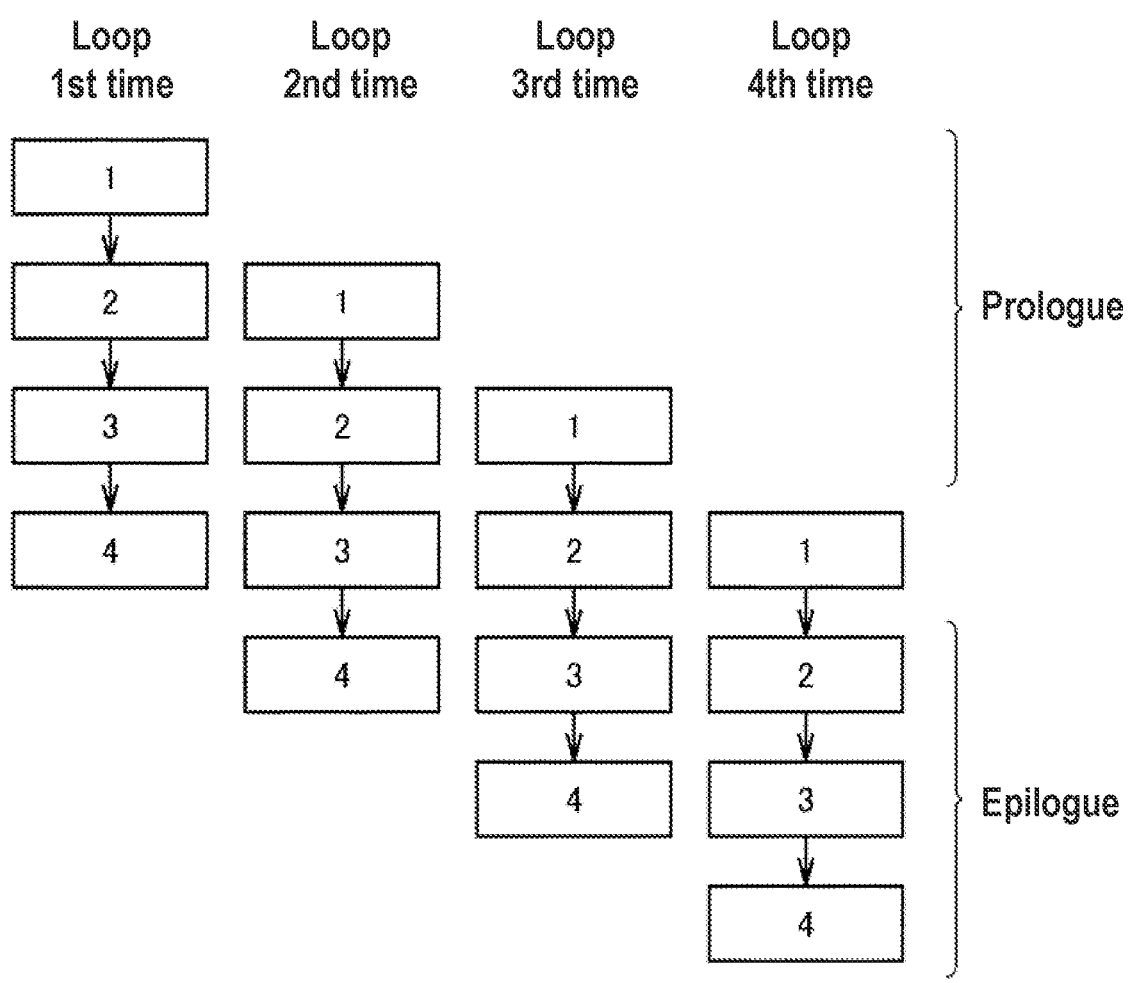
FIG. 28 is a diagram illustrating an example of execution of the pipeline circuit in a case where the number of repetitions of the loop is 4.

FIG. 28 is a diagram illustrating an example of execution of the pipeline circuit in a case where the number of repetitions of the loop is 4.

In the pipeline circuit, the cycle required for the prologue to introduce data and the cycle required for the epilogue to discharge data are required. In the case of a one-state four-stage pipeline circuit, as shown in FIG. 28, three cycles of the prologue and three cycles of the epilogue are required.

Figure 29:
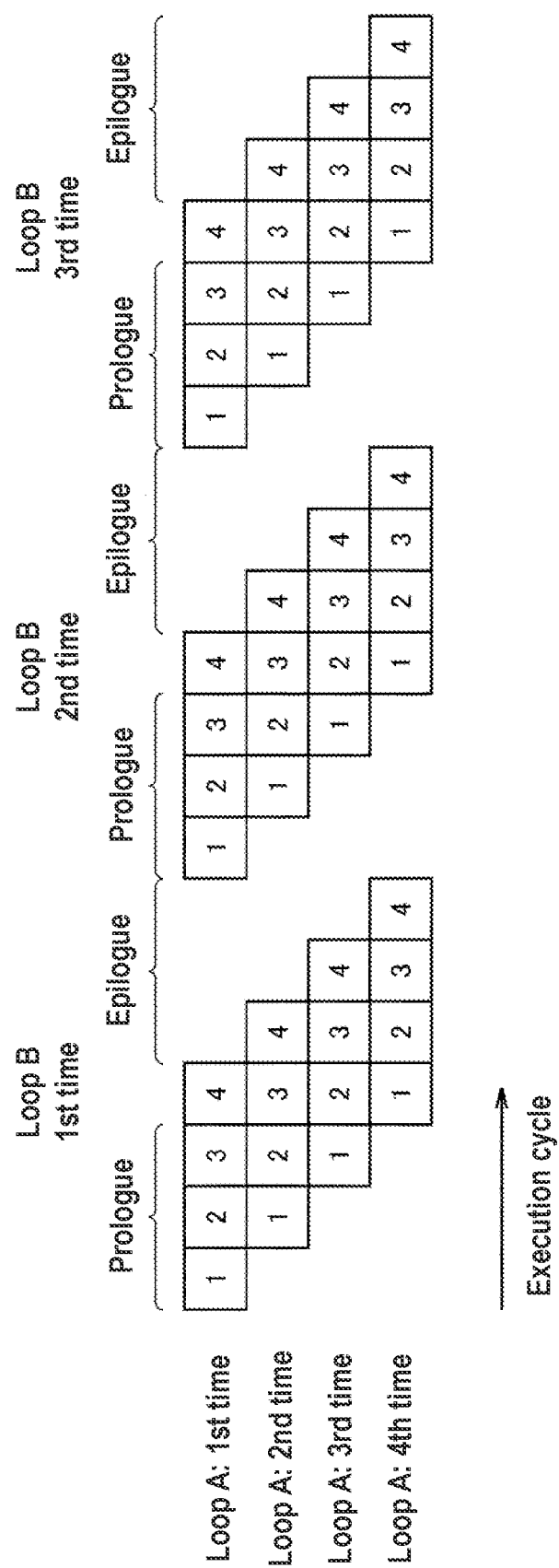
FIG. 29 is a diagram illustrating overhead of pipelining.

FIG. 29 is a diagram illustrating overhead of pipelining. If only the inner loop A is pipelined in a doubly nested loop, there will be another loop outside the one-state four-stage pipeline circuit, as shown in FIG. 29. Each time the outer loop B is executed, the time of the prologue and the epilogue of the inner loop A becomes a gap, resulting in overhead in the execution cycle.

Figure 30:
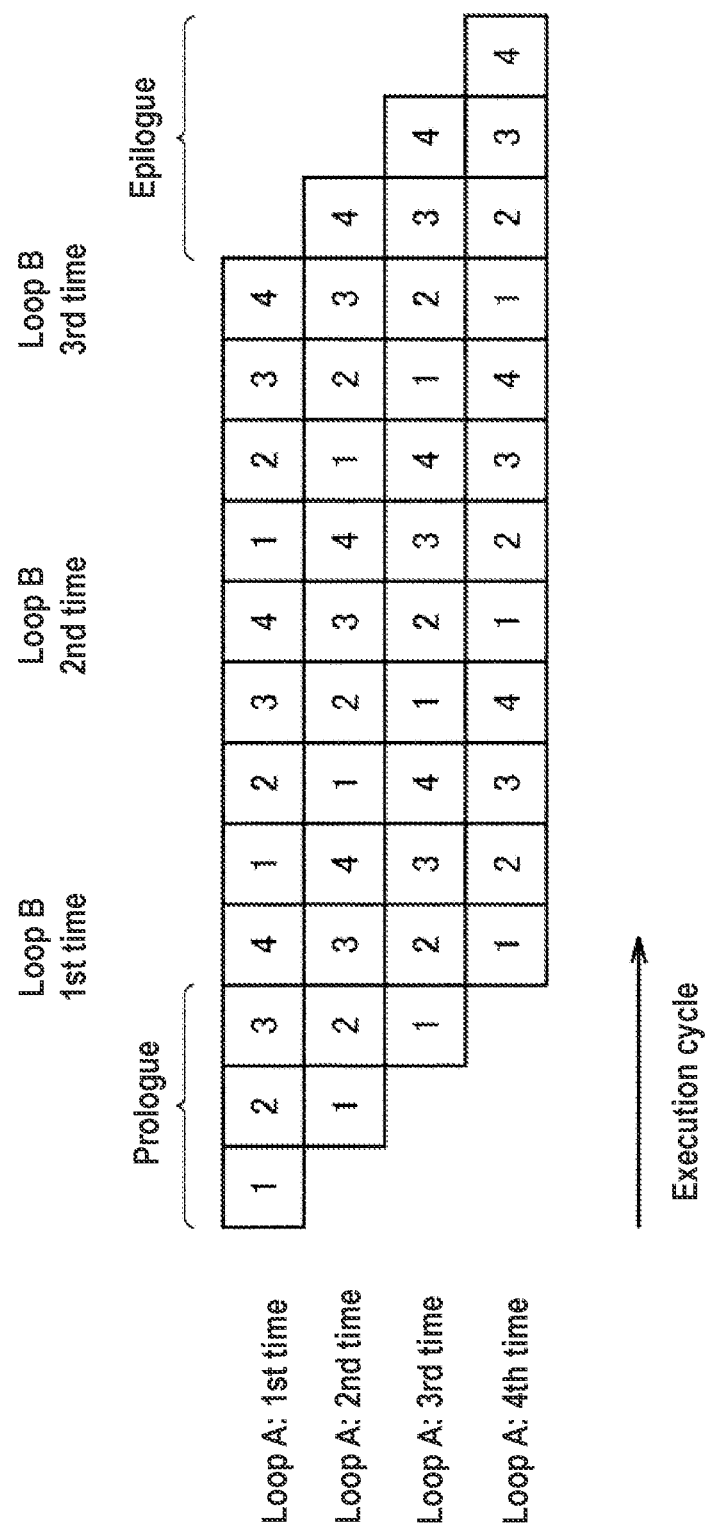
FIG. 30 is a diagram illustrating an example of reducing overhead of pipelining.

FIG. 30 is a diagram illustrating an example of reducing overhead of pipelining.

Motion synthesis unit 900 generates a data path context for causing the first loop counter 22A to increment the loop variable of the loop A after the end of the first stage in each repetition of the loop A. Motion synthesis unit 900 generates a data path context for causing the second loop counter 22B to increment the loop variable of the loop B after the end of the first stage in the last iteration of the loop A.

As a result, at each repetition number of the loop B, after the end of the first stage in which the repetition number of the loop A is the k-th, the first stage in which the repetition number of the loop A is the (k+1)-th starts. After the end of the first stage in the last repetition count of the loop A in the s-th repetition count of the loop B, the first stage in the first repetition count of the loop A in the (s+1)-th repetition count starts.

As shown in FIG. 30, the outer loop can enter the inner loop to form a single loop. As a result, the overhead associated with the prologue and the epilogue of the inner loop that occurs each time the outer loop circulates can be reduced. As a result, the total number of cycles can be reduced.

In the synthesis flow, a circuit corresponding to the counter circuit may be extracted and mapped to the dedicated counter circuit at the time of technology mapping. It is also possible to determine whether or not the circuit matches the dedicated counter circuit, divide the circuit from the multi-nested loop description using a plurality of dedicated counter circuits, connect the programmable wiring therebetween, and the like.

Although the invention made by the present inventor has been specifically described based on the embodiment, the present invention is not limited to the embodiment described above, and it is needless to say that various modifications can be made without departing from the gist thereof.

What is claimed is:

1. A processor comprising:
    an array of multiple programmable logic; and
    at least one dedicated counter circuit for counting variables that are repeatedly modified,
    wherein the counter circuit counts loop variables in a loop description,
    wherein the counter circuit includes a first counter for counting loop variables of a first loop and a second counter for counting loop variables of a second loop outside one of the first loop,
    wherein the first counter outputs a first signal to the second counter when an end condition of the first loop is satisfied,
    wherein the second counter increments a loop variable of the second loop when the first signal is received,
    wherein the counter circuit includes a selection unit, a storage unit, an addition unit, and a comparator,
    wherein the selection unit selects and outputs either an initial value or an output of the addition unit,
    wherein the storage unit stores an output of the selection unit,
    wherein the addition unit adds an output of the storage unit and an increment value, and
    wherein the comparator compares an output of the addition unit with a maximum value, and outputs a signal representing a comparison result, and
    wherein the counter circuit further comprises an inverting unit configured to generate an inverted signal of a signal representing the comparison result.

2. The processor according to claim 1,
    wherein the counter circuit counts an accumulator variable in which incremental values are repeatedly added within a loop.

3. The processor according to claim 1,
    wherein the processor further comprises a state transition controller for controlling a state transition of the processor by controlling the programmable logic and the counter circuit, and
    wherein the second counter outputting a second signal to the state transition controller when an end condition of the second loop is satisfied.

4. The processor according to claim 1,
    wherein the counter circuit includes a first counter for counting lower bits of a loop variable, a second counter for counting upper bits of the loop variable, and a double width determination unit for determining whether an end condition of the loop is satisfied based on a value of the first counter and a value of the second counter, and
    wherein the first counter outputs a carry signal to the second counter when the lower bits of the loop variable exceed a maximum value, and the second counter increments the upper bits of the loop variable when the carry signal is received.

5. The processor according to claim 1,
    wherein, in a first mode, the counter circuit counts a loop variable of a multiple loop including a first loop and a second loop outside one of the first loop, and in a second mode, counts a loop variable of two times a width of a third loop,
    wherein the counter circuit includes a first counter for counting loop variables of the first loop in the first mode and counting lower bits of loop variables of the third loop in the second mode, a second counter for counting a loop variable of the second loop in the first mode and counting upper bits of loop variables of the third loop in the second mode, and a double width determination unit determines whether an end condition of the first loop is satisfied based on a value of the second counter and a value of the third counter in the second mode, wherein the first counter, in the first mode, outputs a first signal to the second counter when the end condition of the first loop is satisfied, wherein the second counter, in the first mode, when receiving the first signal, increments the loop variable of the second loop, wherein the first counter, in the second mode, when the lower bit of the loop variable of the third loop exceeds the maximum value, outputs the first signal to the second counter, and wherein the second counter, in the second mode, when receiving the first signal, increments the upper bits of the loop variables of the third loop.

6. The processor according to claim 1, wherein the processor further comprises a state transition controller for controlling the programmable logic and the counter circuit to control a state transition of the processor, and wherein the counter circuit is disposed adjacent to the state transition controller.

7. The processor according to claim 1, wherein the at least one counter circuit includes a first counter circuit and a second counter circuit, wherein the first counter circuit, in a first mode, counts a loop variable of a multiple loop including a first loop and one outer second loop of the first loop, the second counter circuit, in the first mode, counts a loop variable of a multiple loop including a third loop and one outer fourth loop of the third loop, wherein the first counter circuit, in a second mode, counts a loop variable of second times a bit width of a fifth loop inside the second loop, the second counter circuit, in the second mode, counts a loop variable of second times a bit width of a sixth loop outside one of the fifth loop, wherein a first counter circuit includes a first counter for counting a loop variable of the first loop in the first mode and counting a lower bit of a loop variable of the fifth loop in the second mode, a second counter for counting a loop variable of the second loop in the first mode and counting an upper bit of a loop variable of the fifth loop in the second mode, and in the second mode, a double width determination unit that determines whether an end condition of the fifth loop is satisfied based on a value of the first counter and a value of the second counter and that outputs the fifth loop a condition establishment signal when an end condition of the fifth loop is satisfied, wherein the first counter outputs a first condition establishment signal to the second counter in the first mode when the end condition of the first loop is satisfied, wherein the second counter increments the loop variable of the second loop when receiving the first condition establishment signal in the first mode, wherein the first counter outputs the first condition establishment signal to the second counter in the second mode when a lower bit of a loop variable of the fifth loop exceeds a maximum value, wherein the second counter increments the loop variable of the second loop when receiving the first condition establishment signal in the first mode, wherein the first counter outputs the first condition establishment signal to the second counter in the second mode when a lower bit of a loop variable of the fifth loop exceeds a maximum value, wherein the second counter increments an upper bit of a loop variable of the fifth loop in the second mode when a second condition establishment signal is received, wherein the second counter circuit includes a first counter for counting loop variables of the third loop in the first mode and counting lower bits of loop variables of the sixth loop in the second mode, a second counter for counting loop variables of the fourth loop in the first mode and counting upper bits of loop variables of the sixth loop in the second mode, and a double width determination unit determines whether an end condition of the sixth loop is satisfied based on a value of the first counter and a value of the second counter in the second mode, wherein the first counter outputs a first condition establishment signal to the second counter in the first mode when the end condition of the third loop is satisfied, wherein the second counter increments the variable of the fourth loop in the first mode when the first condition establishment signal is received, wherein the first counter, in the second mode, when receiving a condition establishment signal of the fifth loop, increments the lower bits of the loop variable of the sixth loop, wherein the first counter outputs the first condition establishment signal to the second counter in the second mode when the lower bit of the loop variable of the sixth loop exceeds a maximum value, and wherein the second counter, in the second mode, upon receiving the first condition establishment signal, increments the upper bit of the loop variable of the sixth loop.

8. The processor according to claim 1, wherein the at least one counter circuit includes a first counter circuit for counting loop variables of the first loop and a second counter circuit for counting loop variables of a second loop outside one of the first loop, wherein the first counter circuit outputs a first signal to the programmable logic when the end condition of the first loop is satisfied, wherein the programmable logic performs a logical operation based on the first signal and outputs an increase instruction signal to the second counter circuit when a result of the logical operation satisfies a predetermined condition, and wherein the second counter circuit increments a loop variable of the second loop upon receiving the increase instructions signal.

9. The processor according to claim 8, further comprising a state transition controller for controlling a state transition of the processor by controlling the programmable logic and the counter circuit, wherein the second counter circuit outputs a second signal to the state transition controller when an end condition of the second loop is satisfied.

10. The processor according to claim 1, further comprising a memory and a state transition controller for controlling a state transition of the processor by controlling the programmable logic and the counter circuit, wherein the at least one counter circuit includes a first counter circuit arranged in a vicinity of the state transition controller and counting a first variable and a second counter circuit arranged in an vicinity of the memory and counting the first variable.

11. A non-transitory computer-readable medium storing instructions that, when executed by one or more processors, cause the one or more processors to implement compiler that generates code to be executed by Dynamically Reconfigurable Processor, the compiler comprising:

a motion synthesis unit, wherein the Dynamically Reconfigurable Processor comprises:

an array of programmable processors;

a first counter for counting loop variables of a first loop, the first counter comprising:

a selection unit configured to select and output either an initial value or an output of an addition unit;

a storage unit configured to store an output of the selection unit;

the addition unit configured to add an output of the storage unit and an increment value;

a comparator configured to compare an output of the addition unit with a maximum value and to output a signal representing a comparison result; and an inverting unit configured to generate an inverted signal of the signal representing the comparison result;

a second counter for counting loop variables of a second loop outside one of the first loop; and a state transition controller for controlling a state transition of Dynamically Reconfigurable Processor by controlling the programmable processors, the first counter, and the second counter, and wherein the motion synthesis unit pipelines a process inside the first loop into a plurality of stages, generates configuration data to cause the first counter to increment the loop variable of the first loop after an end of a first stage of the plurality of stages in each iteration of the first loop, and generates a data path context which makes the second counter to increment the loop variable of the second loop after the end of the first stage in a last repetition of the first loop.

* * * * *